(12) United States Patent
Pope, V et al.

(10) Patent No.: US 10,231,029 B2
(45) Date of Patent: Mar. 12, 2019

(54) CHANNEL SCHEDULING WITH CONTENT PLACEMENT OPPORTUNITIES AND A BIDDING-BASED EXCHANGE SYSTEM

(71) Applicant: Turner Broadcasting System, Inc., Atlanta, GA (US)

(72) Inventors: Mark Cooper Pope, V, Atlanta, GA (US); Nishith Kumar Sinha, Mableton, GA (US); Nicolas Paul Webb, Mcdonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 40 days.

(21) Appl. No.: 15/396,608

(22) Filed: Dec. 31, 2016

(65) Prior Publication Data
US 2018/0192159 A1 Jul. 5, 2018

(51) Int. Cl.
| | |
|---|---|
| *H04N 21/81* | (2011.01) |
| *G06Q 30/02* | (2012.01) |
| *H04N 21/2668* | (2011.01) |
| *H04N 21/234* | (2011.01) |
| *H04N 21/45* | (2011.01) |
| *H04N 21/458* | (2011.01) |
| *H04N 21/262* | (2011.01) |

(Continued)

(52) U.S. Cl.
CPC ....... *H04N 21/812* (2013.01); *G06Q 30/0264* (2013.01); *G06Q 30/0275* (2013.01); *H04N 21/23424* (2013.01); *H04N 21/2668* (2013.01); *H04N 21/26258* (2013.01); *H04N 21/458* (2013.01); *H04N 21/4532* (2013.01); *H04N 21/4758* (2013.01); *H04N 21/482* (2013.01)

(58) Field of Classification Search
USPC .............................................. 725/1–8, 32–36
See application file for complete search history.

(56) References Cited

U.S. PATENT DOCUMENTS

2005/0137958 A1* 6/2005 Huber .................... G06Q 30/02
  705/37
2009/0125936 A1* 5/2009 Kulasekaran .......... H04H 60/06
  725/32

(Continued)

FOREIGN PATENT DOCUMENTS

WO WO-2008021373 A2 * 2/2008 ............... G06Q 3/02

*Primary Examiner* — Nicholas T Corbo
(74) *Attorney, Agent, or Firm* — Chip Law Group

(57) ABSTRACT

A media content packaging and distribution system that handles the distribution of one or more channels, receives a programming schedule of a channel of the one or more channels which includes one or more content placement opportunities (CPOs). At least a CPO from the one or more CPOs, associated metadata, and one or more channel parameters of the channel is communicated to an exchange system to facilitate a bidding procedure to populate the CPO with a media item related to a winning bid in the bidding procedure. The media item related to the winning bid is dynamically inserted at a specified position in a media feed associated with the CPO. A resultant media feed that includes the media item is distributed over a distribution network to be viewed on one or more consumer devices. The media item inserted in the resultant media feed is selected by a bidder associated with the winning bid based on an outcome of the bidding procedure in the exchange system.

30 Claims, 10 Drawing Sheets

(51) Int. Cl.
*H04N 21/482* (2011.01)
*H04N 21/475* (2011.01)

(56) References Cited

U.S. PATENT DOCUMENTS

| | | | |
|---|---|---|---|
| 2014/0282723 A1* | 9/2014 | Sinha | H04H 60/40 |
| | | | 725/35 |
| 2016/0044374 A1* | 2/2016 | Ren | H04N 21/44016 |
| | | | 725/34 |
| 2017/0099525 A1* | 4/2017 | Ray | H04N 21/812 |

* cited by examiner

CHANNEL SCHEDULING WITH CONTENT PLACEMENT OPPORTUNITIES AND A BIDDING-BASED EXCHANGE SYSTEM

CROSS-REFERENCE TO RELATED APPLICATIONS/INCORPORATION BY REFERENCE

Not Applicable.

FIELD OF TECHNOLOGY

Certain embodiments of the disclosure relate to management of television and radio programming in broadcast systems. More specifically, certain embodiments of the disclosure relate to a method and system for channel scheduling with content placement opportunities and a bidding-based exchange system.

BACKGROUND

Advancements in the broadcast media sector have led to the development of various technologies and distribution platforms that are changing the way media content is presented to consumers. Distribution platforms usually refers to the types of networks that are used to deliver the media content presentation to the consumers. Currently, all the distribution platforms, such as analog terrestrial broadcast, digital terrestrial broadcast, direct-to-home satellite broadcast, cable, Internet Protocol (IP), and over-the-top television (OTT), compete and strive to increase their appeal in order to gain higher revenues. The television viewing market is no longer exclusively concerned with whether media content services are viewed on a dedicated television or another device capable of playing media content. As a result of penetration of new technologies in the broadcast media sector, it is evident that the success of media content distribution or broadcasting will be dependent on the ability of the network provider to provide new avenues to their affiliates, differentiation of their offerings from that of incumbent broadcasters, or by re-engineering to find new modes of content delivery.

Traditionally, a network provider (network operator) usually decides what shows to air in the upcoming broadcast year and when to air them. A programming schedule defines what to broadcast and when, ensuring an adequate or maximum utilization of airtime. Accordingly, a bidding procedure is initiated well in advance for selling of airtime slots. The media content related to winning bids is packaged into brands, or organized into channels to be delivered to consumers. Increased competition has led the broadcast providers (or the network providers) to differentiate their offering and handle multiple channels at the same time, which in turn have added unparalleled levels of complexity. This required installation of large infrastructures and resources to maintain uninterrupted content delivery for existing channel and also meet the ever increasing demand of new channels offerings. Thus, an advanced system may be required that provides the network provider with an ability to provide new channel offerings in a cost-effective manner.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for channel scheduling with content placement opportunities and a bidding-based exchange system, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
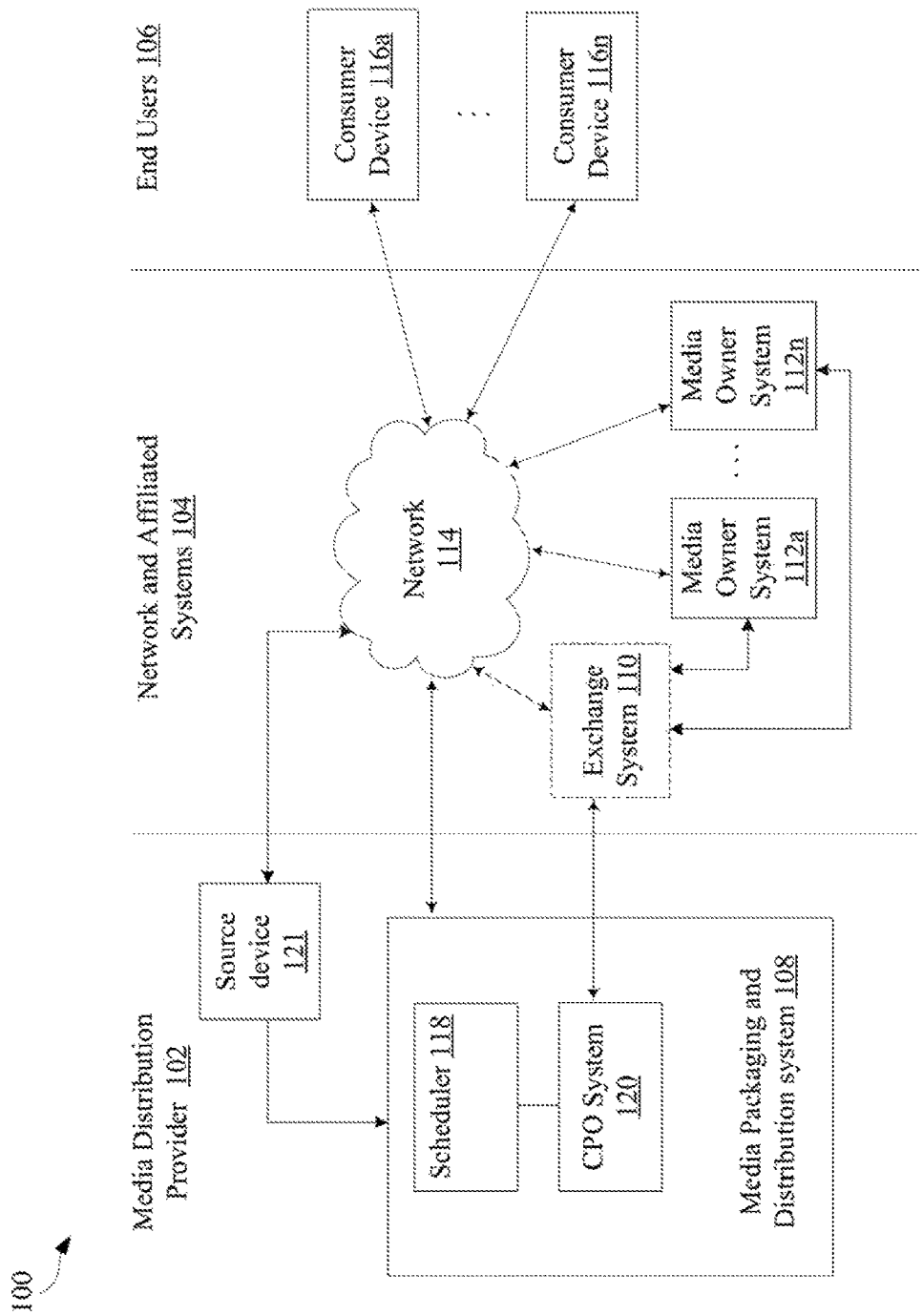
FIG. 1A is a block diagram that illustrates an exemplary system for channel scheduling with content placement opportunities, in accordance with an exemplary embodiment of the disclosure.

Certain embodiments of the disclosure may be found in a method and system for channel scheduling with content placement opportunities (CPOs) and a bidding-based exchange system. Various embodiments of the disclosure provide a method and system that simplifies scheduling and channel creation process, and provides the network provider with an ability to not only provide new channel offerings in cost-effective manner but also provide an efficient and faster procedure for insertion of new content in already existing channels based on a feedback received from the bidding-based exchange system.

In accordance with various embodiments of the disclosure, a media packaging and distribution system may be configured to handle distribution of one or more channels to be viewed on one or more of a plurality of consumer devices. The media packaging and distribution system may be configured to receive a programming schedule of a channel of the one or more channels which includes one or more content placement opportunities (CPOs). At least a CPO from the one or more CPOs, associated metadata, and one or more channel parameters of the channel are communicated to an exchange system to facilitate a bidding procedure to populate the CPO with a media item related to a winning bid in the bidding procedure. The media item related to the winning bid is dynamically inserted at a specified position in a media feed associated with the CPO. A resultant media feed that includes the media item is distributed over a distribution network to be viewed on or more consumer devices. The media item that is inserted in the resultant media feed is selected by a bidder associated with the winning bid based on an outcome of the bidding procedure in the exchange system.

In accordance with an embodiment, the media feed related to the programming schedule may be received. The media item may be dynamically inserted at the specified position associated in the media feed associated with the CPO based on a real time or near-real time feedback of the winning bid received from the exchange system. A reference to a location of the media item related to the winning bid from the exchange system. The reference of the location is included in a feedback received from the exchange system. The media item may be retrieved from a data storage device, based on the received reference of the location of the media item. The insertion of the media item may be based on a presence of an inbound trigger at the specified position in the media feed associated with the CPO.

In accordance with an embodiment, the programming schedule may be extended by repeating the process of CPO-detection, CPO-bidding, and media item insertion in the media feed generated by the media packaging and distribution system. The media item may be a non-commercial advertising media item. Alternatively, the media item may be a commercial advertising media item. A plurality of segments of the media feed that comprises the dynamically inserted media item may be stored as a plurality of pre-encoded media assets. The one or more channel parameters may include a demographic parameter, a day-part or time-of-day parameter, a viewership parameter, a maturity content-rating parameter, and/or other parameters describing the CPO, for use in the exchange system.

In accordance with an embodiment, a new channel may be created from the channel based on the insertion of another media item at the specified position of the CPO. The other media item may be dynamically inserted in the media feed at the specified position of the CPO to create the new channel. The other media item may be dynamically inserted based on another feedback related to another winning bid for the CPO received from the exchange system. A new programming schedule may be generated for the new channel to include the other media item. The new programming schedule may be generated such that the other media item is inserted at the specified position associated with the CPO in the media feed for the new channel. The new channel may be delivered through the distribution network to be viewed on the one or more of consumer devices. In accordance with an embodiment, bidding requirement criteria from the exchange system may be received in a reverse bidding operation to identify another CPO in the one or more channels relevant to the bidding requirement criteria. The bidding requirement criteria may include a demographics criterion, a daypart criterion, a selling title criterion, viewership criterion, and/or any other criterion necessary to sufficiently describe the CPO, the bidding procedure, or content offered for a bid in the bidding procedure.

Typically, a network provider (network operator) prepares a programming schedule (or a programming schedule) of the upcoming broadcast year well in advance. Thus, what shows to air in the upcoming broadcast year and when to air them is pre-decided, to plan an adequate or maximum utilization of airtime. Typically, a bidding procedure may be initiated in advance for selling of airtime slots for the preparation of the programming schedule. The media content related to winning bids is packaged into brands, or organized into channels to be delivered to consumers. However, in a scenario where a real-time content placement opportunity (CPO) emerges for a channel, the whole programming schedule of the channel is disrupted. Re-packaging or re-organization of the channels is further required for filling up the airtime slot related to the real-time CPO with the new content. This places additional burden on the broadcast network providers to cater the dynamically changing scenario for real time channel creation or content insertion for real time CPO.

FIG. 1A is a block diagram that illustrates an exemplary system for channel scheduling with content placement opportunities, in accordance with an exemplary embodiment of the disclosure. Referring to FIG. 1A, the system 100, comprises various sub-systems and components associated with a media distribution provider 102, a network and affiliated systems 104, and end users 106. The system 100 may include a media packaging and distribution system 108 of the media distribution provider 102. The media packaging and distribution system 108 may be communicatively coupled to an exchange system 110, via a network 114. There is shown a plurality of media owner systems 112a, . . . , 112n that are communicatively coupled to the media packaging and distribution system 108, via the exchange system 110. The plurality of media owner systems 112a, . . . , 112n and the exchange system 110 may also be communicatively coupled to the network 114, and may be a part of the network and affiliated systems 104. A plurality of consumer devices 116a, . . . , 116n may be communicatively coupled to the network 114. The plurality of consumer devices 116a, . . . , 116n may be associated with end users 106. The media packaging and distribution system 108 may comprise a scheduler 118 and a CPO system 120. There is also shown a source device 121.

The media distribution provider 102 may be configured to handle one or more channels, or one or more networks. The media distribution provider 102 may be configured to distribute the one or more channels to be viewed by end users 106 on a plurality of consumer devices (such as the consumer devices 116a, . . . , 116n). The media distribution provider 102 may include the media packaging and distribution system 108. Examples of the one or more channels distributed by the media distribution provider 102 may include traditional over-the-air broadcast channels, cable television networks, satellite communication networks, the Internet, and/or other content delivery networks (CDNs).

The network and affiliated systems 104 may include the network 114 and one or more second party or third party systems that may be associated with the media distribution provider 102. As an example, in the broadcasting sector, a broadcasting network includes multiple stations that air programming from a same unified source. Typically, some local stations sign agreements with the media distribution provider 102 to become affiliates of a broadcast network, which gives the station popular programming and allows the broadcast network to widen its reach. In accordance with an embodiment, the exchange system 110 may not be owned by the media distribution provider 102 and may correspond to the second party or third party systems. Alternatively, in accordance with an embodiment, the exchange system 110 may be owned by the media distribution provider 102 and may be a part of the media distribution provider 102.

The end users 106 refer to the consumers that may view the one or more channels that are distributed by the media distribution provider 102. The end users 106 may be associated with the consumer devices (such as the plurality of consumer devices 116a, . . . , 116n) to view the one or more channels.

The media packaging and distribution system 108 may comprise suitable logic, circuitry, and interfaces that may be configured to execute code that handles the distribution of the one or more channels (such as a television content channel) to be viewed on the plurality of consumer devices 116a, . . . , 116n. In this regards, the media packaging and distribution system 108 may be configured to schedule the one or more channels based on one or more CPOs identified in the one or more channels. A CPO may refer to one or more spots in an already existing channel, in which lies an opportunity to replace a media item of an already existing channel with a new media item. For example, an existing channel (such as a program stream) may have a content slot for which a previous deal with a media owner is about to expire or the order of the media owner is cleared. Thus, after the expiry of the deal or the clearance of the order, the content slot may be vacant. In this scenario, based on a programming schedule of the existing channel, the vacant content slot may be identified as a CPO in the already existing channel. The media packaging and distribution system 108 may be operated by an entity related to handling or distribution of media content, for example, a broadcast provider or operator, or a network provider or operator. The entity related to handling or distribution of media content may also refer to a content owner, a distributor, a syndicator, a re-distributor, a content aggregator, a search, discovery, or cataloging service provider, or any other entity actively or passively involved with the distribution, cataloging, or referencing of complete or partial presentations of media content. The media content may include a video, an audio, a combination of audio and video presentations, a combination of audio, video, and/or embedded or externally referenced metadata, a combination of multiple-audio, multiple-video, and/or embedded or externally referenced metadata. The media content may also include metadata associated with the audio/video presentation, such as game scores, statistics, or timings, social media, cast/character/credits, geo-spatial data, and/or still-images or graphics (referenced or embedded). Throughout this document, the terms broadcast provider or broadcast operator, and network provider or network operator may be utilized to refer to the entity related to handling or distribution of media content, interchangeably.

The exchange system 110 may comprise suitable logic, circuitry, and interfaces that may be configured to execute code that handles a bidding procedure for the one or more CPOs detected by the media packaging and distribution system 108. In this regard, the exchange system 110 may be configured to communicate information pertaining to at least a CPO in a channel to a plurality of media owners to facilitate bidding procedure for the CPO. The exchange system 110 may be further configured to select one or more winning bids for the CPO based on a defined set of rules. The defined set of rules may include rules for the selection of the one or more winning bids. For example, according to a rule the highest bid may correspond to a winning bid. The exchange system 110 may further provide a feedback to the media packaging and distribution system 108, such that the feedback includes information pertaining to the one or more winning bids.

The plurality of media owner systems 112a, . . . , 112n may comprise suitable logic, circuitry, and interfaces that may be configured to electronically place bids for the one or more CPOs in a bidding procedure facilitated by the exchange system 110. The plurality of media owner systems 112a, . . . , 112n may be associated with the plurality of media owners that may either own media content or may have purchased license for the selling rights of the media items. Each of the plurality of media owners may place bid for the one or more CPOs for booking their media items for the one or more CPOs in a selling title (ST). The ST may refer to a program in which an inventory bucket airs. Each inventory bucket may represent an inventory unit. In other words, the ST is an interval of programming time that a network provider utilizes to sell commercial airtime, and it may comprise a particular show (Dallas, Cougar Town, etc.) or a block or time (Daytime—8:00 AM to 3:00 PM, Overnight—12:00 midnight to 6:00 AM, etc.). In some cases, the term daypart may be utilized as an alternative name for a ST, but in other cases a daypart may be an aggregation of STs.

The network 114 may be any kind of network, or a combination of various networks, and it is shown illustrating the communication that may occur between the media packaging and distribution system 108, the exchange system 110, the plurality of media owner systems 112a, . . . , 112n, and the plurality of consumer devices 116a, . . . , 116n. For example, the network 114 may comprise one or more of a cable television network, the Internet, a satellite communication network, a wide area network (WAN), a content distribution network (CDN), a medium area network (MAN), a local area network (LAN), or their variants.

The plurality of consumer devices 116a, . . . , 116n may refer to end-user devices where the one or more channels are played to be viewed by a consumer. The number of impressions of media items, such as non-commercial advertising media items and/or commercial advertising media items, on such plurality of consumer devices 116a, . . . , 116n determines the impact and number of actual audiences achieved for a certain defined time period. Each of the plurality of consumer devices 116a, . . . , 116n may be configured to transmit a playback proof to the exchange system 110 or other independent specified systems to confirm a display of a media item by the media distribution provider 102. Examples of the plurality of consumer devices 116a, . . . , 116n may include, but are not limited to connected TVs, a user-computing device, connected TV with paired devices (e.g., tablets), and second screen devices such as smartphones and tablets, for example.

The scheduler 118 may comprise suitable logic, circuitry, and interfaces that may be configured to execute code that handles the scheduling of the one or more channels for distribution. In this regard, the CPO system 120 in association with the scheduler 118 may receive cleared and/or modified orders of the plurality of media owners and queue them determine placement of the corresponding media items in a media feed (such as a program stream) of each of the one or more channels. The scheduler 118 may be configured to extend an existing programming schedule of each of the one or more channels and generate a new programming schedule, based on the determined placement of the media items. The programming schedule of a channel defines what media content should be scheduled, the ordering of the media content during playout, and when to distribute. The content that is distributed may include both the non-commercial content, such as TV programs, and the commercial content, such as advertisements or promotional media. In accordance with an embodiment, the programming schedule may be a text file or an XML file, that comprise a reference mapping of different media items that needs to be stitched by a stream manipulator 124 (described in FIG. 1B) such as, for example, a video-on-demand (VOD) to live stream manipulator. The scheduler 118 may receive a programming schedule of an existing channel from a source device 121 that communicates a broadcast signal. The scheduler 118 may extend the received programming schedule, where the extension of the programming schedule may be driven by real time or near-real time feedback received from the exchange system 110.

The CPO system 120 may comprise suitable logic, circuitry, and interfaces that may be configured to execute code that handles the CPOs included in the programming schedule of the one or more channels. In this regards, the CPO system 120 may be configured to detect the one or more CPOs in the programming schedule of each of the one or more channels. For example, based on the programming schedule of an already existing channel, the CPO system 120 may identify a content slot for which a previous deal with a media owner is about to expire or to maximize utilization of existing inventory. Thus, after the expiry of the deal, the content slot may be vacant. In this scenario, the CPO system 120 may detect the vacant content slot as a CPO in the already existing channel. The CPO system 120 may be further configured to determine one or more channel parameters of the channel in which the CPO is detected.

The source device 121 may comprise suitable logic, circuitry, and interfaces that may be configured to communicate a media feed and a programming schedule of a channel, such as an existing channel, to the media packaging and distribution system 108. In accordance with an embodiment, the source device 121 may communicate a reference to the location of the media feed related to the programming schedule to the media packaging and distribution system 108. The media feed of the channel may correspond to a broadcast feed. The source device 121 may be communicatively coupled to the network 114.

In operation, the media packaging and distribution system 108 may be configured to handle distribution of one or more channels (may also referred to as television content channels or program streams) to be viewed on one or more of a plurality of consumer devices (such as the plurality of consumer devices 116a, . . . , 116n). The media packaging and distribution system 108 may receive a programming schedule of a channel of the one or more channels which includes one or more content placement opportunities (CPOs). The media feed may correspond to an already existing program stream of the channel. The CPO system 120 may be configured to communicate at least a CPO from the one or more CPOs, associated metadata, and one or more channel parameters of the channel to the exchange system 110 to facilitate a bidding procedure to populate the CPO with a media item related to a winning bid in the bidding procedure. The one or more channel parameters may include a demographic parameter, a day-part or time-of-day parameter, a viewership parameter, a maturity content-rating parameter, and/or any other parameters describing the CPO, for use in the exchange system. The scheduler 118 may dynamically insert the media item related to the winning bid at a specified position in the media feed associated with the CPO. The resultant media feed that includes the media item, may be distributed over a distribution network (such as the network 114) to be viewed on the one or more consumer devices. The media item inserted in the resultant media feed may be selected by a successful bidder (such as a media owner) associated with the winning bid, based on an outcome of the bidding procedure in the exchange system 110.

The media item may be dynamically inserted at the specified position in the media feed associated with the CPO based on a real time or near-real time feedback of the winning bid received from the exchange system 110. The media item may correspond to non-commercial advertising media item and/or a commercial advertising media item. The dynamic insertion of the media item may be based on a presence of an inbound trigger at the specified position in the media feed related to the CPO. The scheduler 118 may be further configured to extend the programming schedule by repeating the process of CPO-detection, CPO-bidding, and media item insertion in the media feed. An example of the CPO-detection, CPO-bidding, and the media item insertion in the media feed is shown and described in FIG. 3.

In accordance with an embodiment, the system 100 may comprise a plurality of exchange systems (such as the exchange system 110). Thus, in a scenario where a plurality of CPOs are detected in the media feed of the first channel by the CPO system 120, the information related to available CPOs may be distributed among the plurality of exchange systems to facilitate concurrent bidding procedures.

Figure 1B:
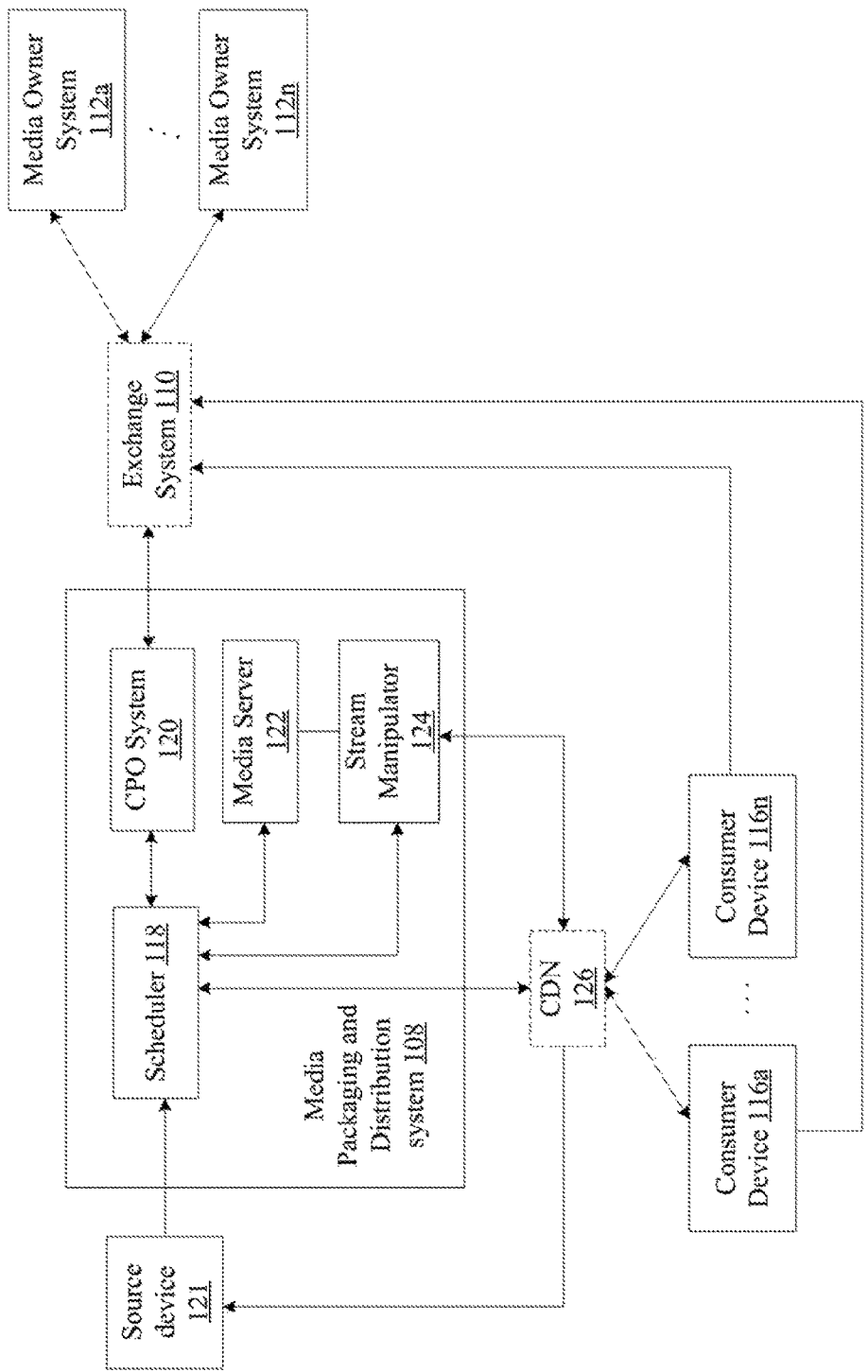
FIG. 1B is a block diagram that illustrates an exemplary media packaging and distribution system for channel scheduling with content placement opportunities, in accordance with an exemplary embodiment of the disclosure.

FIG. 1B is a block diagram that illustrates an exemplary media packaging and distribution system for channel scheduling with CPOs, in accordance with an exemplary embodiment of the disclosure. Referring to FIG. 1B, the media packaging and distribution system 108 may further comprise a media server 122 and the stream manipulator 124. The media packaging and distribution system 108 may be communicatively coupled to a CDN 126. There is also shown the scheduler 118 and the CPO system 120 included in the media packaging and distribution system 108. There is further shown the exchange system 110, the plurality of media owner systems 112a, . . . , 112n, the plurality of consumer devices 116a, . . . , 116n, and the source device 121, as described in FIG. 1A.

In some embodiments of the disclosure, the scheduler 118, the CPO system 120, the media server 122, and the stream manipulator 124 may be integrated to form an integrated system. In some embodiments of the disclosure, as shown, the CPO system 120 may be distinct from the scheduler 118, the media server 122, and the stream manipulator 124. In some embodiment, as shown, the media server 122 may be integrated as part of the media packaging and distribution system 108 or may be separate. In some embodiments, the exchange system 110 may be integrated as part of the media packaging and distribution system 108, to form an integrated system. In some embodiments of the disclosure, as shown, the exchange system 110 may be a second party or a third party system separate from the media packaging and distribution system 108. Other separation and/or combination of the various entities of the exemplary media packaging and distribution system illustrated in FIG. 1B may be done without departing from the spirit and scope of the various embodiments of the disclosure.

The media server 122 may comprise suitable logic, circuitry, and interfaces that may be configured to execute code that handles a plurality of media assets. The plurality of media assets may include a plurality of segments of a media feed comprising a dynamically inserted media item. The plurality of segments of the media feed (i.e., the media assets such as VOD assets and/or audio assets) may correspond to pre-encoded media assets that are encoded before storage in the media server 122. The encoded plurality of segments may be used and re-used to create different program streams for an existing channel or new channel without a requirement to re-encode. The media server 122 may be an example of a media server 122.

The stream manipulator 124 may comprise suitable logic, circuitry, and interfaces that may be configured to execute code that handles dynamic insertion of the pre-encoded media assets based on a programming schedule (such as the programming schedule or the extended programming schedule) to generate a specific program stream to be delivered to one or more of the plurality of consumer devices 116a, ..., 116n. The decision as to which pre-encoded media assets to select for delivery through a distribution network (such as the network 114) to the plurality of consumer devices 116a, ..., 116n, may be based on the manipulation of the programming schedules that may be done in real time or near-real time. The stream manipulator 124 may be further configured to dynamically insert the media item (i.e., the selected VOD asset) at the specified position associated with a detected CPO based on a presence of an inbound trigger, such as society of cable telecommunication engineers (SCTE)-104-based trigger, at the specified position associated with the detected CPO. The manipulation of the programming schedules may be driven by real time or near-real time feedback (described in FIG. 3), received from the exchange system 110. The pre-encoded media assets may be an example of a pre-encoded media asset. The stream manipulator 124 may also be referred to as a pre-encoded media content converter.

The CDN 126 may comprise suitable logic, circuitry, and interfaces that may be configured to execute code that handles the distribution of content, such as media feed of the one or more channels, to the end users 106. The CDN 126 may be configured to retrieve the content for distribution based on the programming schedule, from the media server 122. The CDN 126 may further receive the content for distribution from the stream manipulator 124. In accordance with an embodiment, the CDN 126 may correspond to the network 114. The CDN 130 may comprise networks configured for distributing media content. The CDN 126 may be configured for providing the plurality of consumer devices 116a, ..., 116n, with media content via a broadcast (or distribution), such as via an over-the-air content delivery/distribution network, a linear content delivery/distribution network, a cable content delivery/distribution network, a satellite content delivery/distribution network, an Internet Protocol (IP) based content delivery/distribution network, and/or the like. The functions and/or operations performed by the media packaging and distribution system 108, and its various components, are further described, in FIGS. 2, 3, 4A, 4B, 5A, 5B, 6, and 7.

Figure 2:
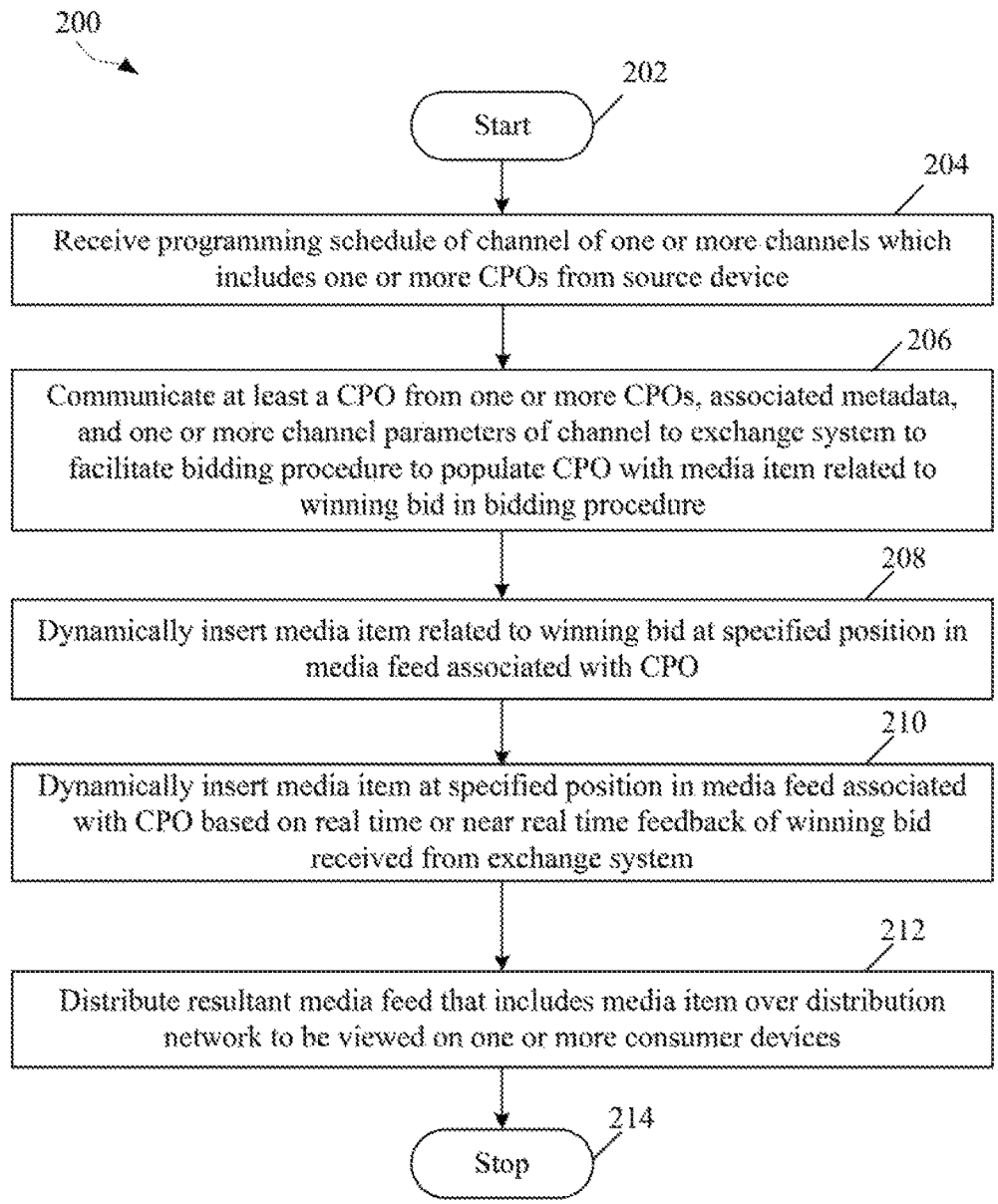
FIG. 2 depicts a flow chart illustrating high-level operations of the media packaging and distribution system of FIG. 1B, in accordance with an exemplary embodiment of the disclosure.

FIG. 2 depicts a flow chart illustrating high-level operation of the media packaging and distribution system of FIG. 1B, in accordance with an exemplary embodiment of the disclosure. Referring to FIG. 2, there is shown a flow chart 200 comprising exemplary operations 202 through 216. The exemplary operations may start at 202 and proceed to 204.

At 204, a programming schedule of a channel of the one or more channels which includes one or more CPOs may be received from the source device 121. The scheduler 118 may be configured to receive the programming schedule of the channel of the one or more channels from the source device 121. The scheduler 118 may be further configured to receive a media feed related to the programming schedule. In accordance with an embodiment, the scheduler 118 may be configured to receive a reference (such as uniform resource locator (URL)) to a location of the media feed from the source device 121. The media feed may correspond to a broadcast feed (or an already distributed or played out) stream of content (such as non-commercial content and commercial content). The CPO system 120 may be configured to detect the one or more CPOs in the programming schedule of the channel. The CPO system 120 may use the programming schedule to identify any content slot that is available for insertion of new content. The CPO system 120 may be further configured to determine the one or more channel parameters of the first channel. The one or more channel parameters may include a demographic parameter, a day-part or time-of-day parameter, a viewership parameter, a maturity content-rating parameter, and/or any other parameters describing the one or more CPOs, for use in the exchange system 110. The demographic parameter may refer to a primary demographic (for instance, the end users 106 between an age group of 25 to 54) engaged by the existing channel. The daypart parameter may refer to an airtime slot (for instance 8:00 AM to 9:00) related to the first CPO 306 in the existing channel. The viewership parameter may refer to a count of concurrent end users (for instance "X users") viewing the existing channel. The maturity content-rating parameter may refer to a rating based on the type content to be included at the CPO. For example, the content to be included at the CPO may be for kids. Thus, the maturity content-rating parameter may be "kids" for the CPO. The detection of the CPO is described and shown in FIG. 3.

At 206, at least a CPO from the one or more CPOs, associated metadata, and the one or more channel parameters of the channel may be communicated to the exchange system 110 to facilitate a bidding procedure to populate the CPO with a media item related to a winning bid in the bidding procedure. The CPO system 120 may be configured to communicate at least the CPO from the one or more CPOs, the associated metadata, and the one or more channel parameters of the channel may be communicated to the exchange system 110 to facilitate a bidding procedure to populate the CPO with a media item related to a winning bid in the bidding procedure. The associated metadata may include inbound triggers, such as SCTE-104-based trigger, associated with the CPO.

The communication of the at least CPO is done to facilitate the bidding procedure for the CPO. The exchange system 110 may be configured to electronically publish information pertaining to the CPO, associated metadata, and the one or more channel parameters on the plurality of media owner systems 112a, ..., 112n for facilitating the bidding procedure for the CPO. The plurality of media owners that are interested in availing the CPO for presenting their media items to the end users 106 may place bids for the communicated CPO by use of the corresponding plurality of media owner systems 112a, ..., 112n. The media items may include non-commercial advertising media items and commercial advertising media items. The exchange system 110 may select one or more winning bids for the communicated CPO from the bids received from the plurality of media owner systems 112a, ..., 112n. The selection of the one or more winning bids may be based on a defined set of rules received from the CPO system 120. The defined set of rules may include criteria for the selection of the one or more winning bids. For example, according a rule in the defined set of rules a highest bid may correspond to a winning bid. The selection of the winning bid is described and shown in FIG. 3.

At 208, the media item related to the winning bid may be dynamically inserted at a specified position in the media feed associated with the CPO. The stream manipulator 124 may be configured to dynamically insert the media item related to the winning bid at a specified position in the media feed associated with the CPO. The media item related to the winning bid may be selected by the media owner (a bidder) associated with the winning bid. The information pertaining to the chosen media item may be included in a feedback received from the exchange system 110. The information may include a reference (such as a URL) of a location of the of the chosen media item related to the winning bid. The feedback may be a real time or near-real time feedback of the winning bid related to the bidding procedure for the CPO.

At 210, the media item may be dynamically inserted at a specified position in the media feed associated with the CPO based on the real time or near real time feedback of the winning bid received from the exchange system 110. The stream manipulator 124 may be configured to dynamically insert the media item at the specified position (such as an identified vacant content slot in the channel) in the media feed associated with the CPO based on the real time or near real time feedback of the winning bid received from the exchange system 110. The dynamic insertion of the media item may be based on a modification of the programming schedule by the scheduler 118 be to include the media item related to the winning bid in the programming schedule. The scheduler 118 may modify the programming schedule by extending the programming schedule by repeating the process of CPO-detection, CPO-bidding, and media item insertion.

At 212, the resultant media feed that includes the media item is distributed over the distribution network (such as the network 114) to be viewed on the one or more consumer devices. The stream manipulator 124 may be configured to distribute the resultant media feed that includes the media item over the distribution network (such as the network 114 or the CDN 126) to be viewed on the one or more consumer devices of the plurality of consumer devices 116a, . . . , 116n. Control passes to end 214.

Figure 3:
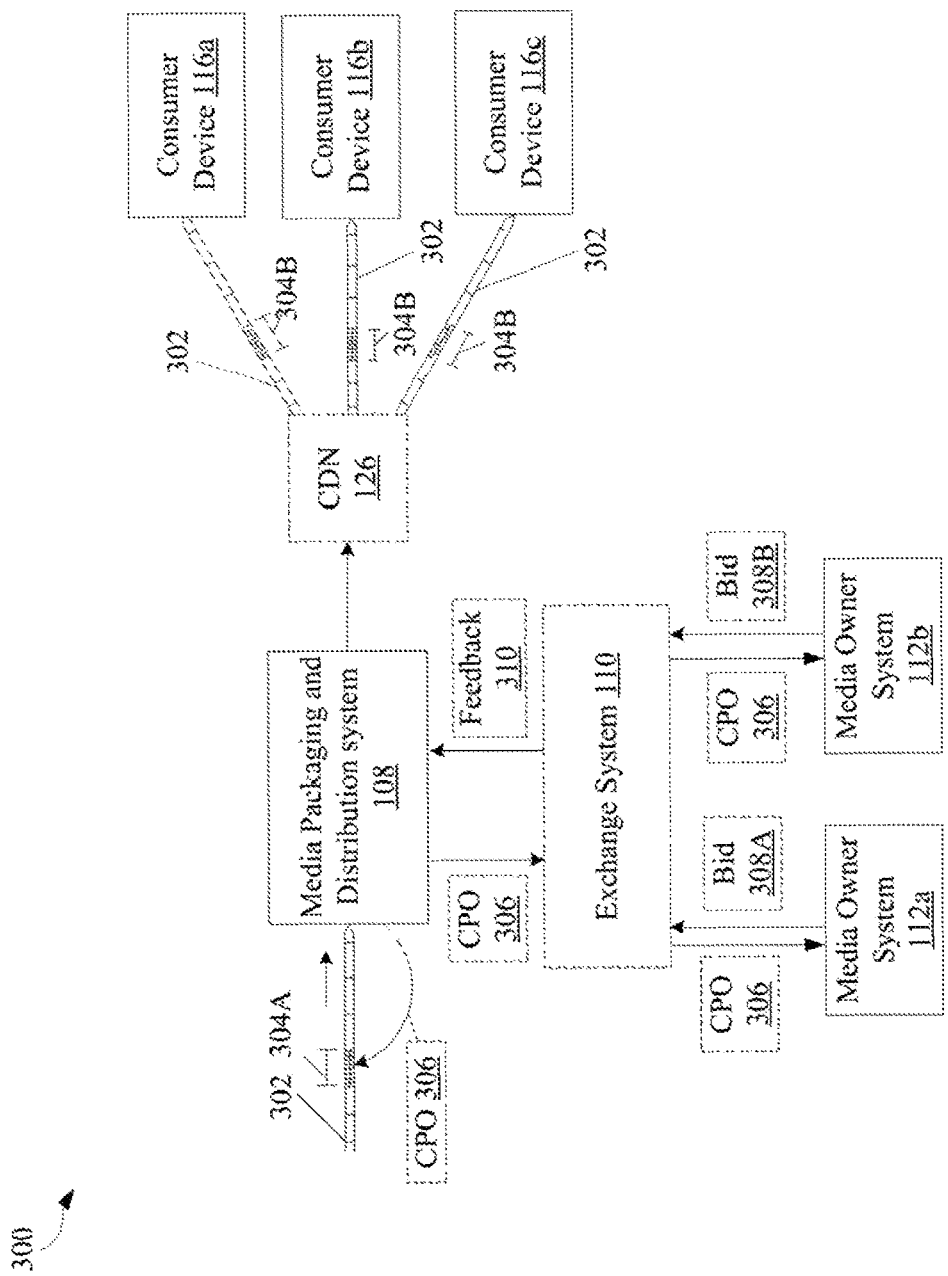
FIG. 3 illustrates an exemplary scenario for channel scheduling with content placement opportunities and a bidding-based exchange system, in accordance with an exemplary embodiment of the disclosure.

FIG. 3 illustrates an exemplary scenario for channel scheduling with content placement opportunities and a bidding-based exchange system, in accordance with an exemplary embodiment of the disclosure. Referring to FIG. 3, there is shown a media feed 302 of an existing channel, a media item 304A included in the media feed 302, a first CPO 306 of the one or more CPOs detected in the media feed 302, a bid 308A from a media owner system 112a for the first CPO 306, another bid 308B from another media owner system 112b for the first CPO 306, and a feedback 310 from the exchange system 110. There is also shown another media item 304B dynamically stitched in the media feed 302. There is further shown, the media packaging and distribution system 108, the CDN 126, and the plurality of consumer devices 116a, 116b, and 116c.

The media packaging and distribution system 108 may receive a programming schedule from the source device 121. The programming schedule may be related to the media feed 302 of the existing channel (such as a broadcast feed). In accordance with an embodiment, the media packaging and distribution system 108 may receive a reference (such as a URL) of the location of the media feed 302 from the source device 121. The media packaging and distribution system 108 may further retrieve the media feed 302 based on the reference of the location. The received/retrieved media feed 302 of the existing channel may include the media item 304A, that has been delivered in the media feed 302 previously to the corresponding consumer devices 116a, 116b, and 116c for viewing by the end users 106. The media feed 302 may have been played out previously in accordance to the received programming schedule. The programming schedule may be stored in a local memory (not shown) of the media packaging and distribution system 108. The programming schedule may include the one or more CPOs.

The CPO system 120 may detect the one or more CPOs (such as the first CPO 306) included in the received programming schedule. For example, based on the programming schedule of the existing channel, the CPO system 120 may identify that a previous order of a media owner pertaining to the media item 304A is cleared. Thus, a content slot related to the media item 304A in the programming schedule of the existing channel may be vacant. In this scenario, the CPO system 120 may detect the first CPO 306 in the media feed 302 that corresponds to the vacant content slot of the already existing channel. The CPO system 120 may be further configured to determine the one or more channel parameters of the existing channel. The one or more channel parameters may include a demographic parameter, a daypart (or time-of-day) parameter, a viewership parameter, a maturity content-rating parameter, and/or any other parameters describing the first CPO 306, for use in the exchange system 110. The demographic parameter may refer to a primary demographic (for instance, the end users 106 between an age group of 25 to 54) engaged by the existing channel. The daypart parameter may refer to an airtime slot (for instance 8:00 AM to 9:00) related to the first CPO 306 in the existing channel. The viewership parameter may refer to a count of concurrent end users viewing the existing channel. The maturity content-rating parameter may refer to a rating based on the type content to be included at the first CPO 306. For example, the content to be included at the first CPO 306 may be for kids. Thus, the maturity content-rating parameter may be "kids" for the first CPO 306.

The CPO system 120 may further communicate at least a CPO (such as the first CPO 306), associated metadata, and the one or more channel parameters of the channel to the exchange system 110. The exchange system 110 may be configured to facilitate a bidding procedure for the communicated first CPO 306. In this regard, the exchange system 110 may electronically publish information pertaining to an availability of a CPO (such as the first CPO 306) on the plurality of media owner systems, such as the media owner systems 112a and 112b. The exchange system 110 may further communicate the associated metadata and the one or more channel parameters of the existing channel (i.e., related to the first CPO 306) to the media owner systems 112a and 112b. The media owners of the corresponding media owner systems 112a and 112b may place bids (such as the bid 308A and 308B, respectively) for availing the first CPO 306 for an insertion of the corresponding chosen media items at the specific position related to the first CPO 306. For instance, the media owner of the media owner system 112a may place the bid 308A of "USD X" and the media owner of the media owner system 112b may place the bid 308B of "USD Y" for availing the first CPO 306.

The CPO system 120 may be configured to select a winning bid among the bids (i.e., the bid 308A and the bid 308B) placed from the plurality of media owner systems 112a and 112b. The CPO system 120 may select the winning bid based on the defined set of rules received from the media packaging and distribution system 108. For instance, in accordance with a defined rule, the CPO system 120 may select a highest bid (such as the bid 308A from the media owner system 112a) as the winning bid. In accordance with a second defined rule, the CPO system 120 may select a highest bid that is received within a predefined interval of time (for instance "10 minutes") after the electronic publication of the first CPO 306. For example, the media owner of the media owner system 112a may place the bid 308A of "USD X" after "15 minutes" of the publication of the first CPO 306 and the media owner of the media owner system 112b may place the bid 308B of "USD Y" for the first CPO 306 after "5 minutes" of the publication of the first CPO 306. In this scenario, the CPO system 120 may select the bid 308B from the media owner system 112b as the winning bid.

The CPO system 120 may transmit the feedback 310 to the media packaging and distribution system 108. The feedback 310 may include details pertaining to the winning bid. For example, the feedback 310 may include a uniform resource locator (URL) of a new media item (also referred to as the media item 304B), chosen by the media owner of the winning bid. The media item 304B may correspond to a non-commercial advertising media item or a commercial advertising media item and may be stored on an external storage device (or pre-stored at the media server 122). The scheduler 118 may be configured to retrieve the media item 304B from the external storage device by use of the URL included in the feedback 310. The media item 304B may then be stored in the media server 122 as a pre-encoded VOD asset.

The scheduler 118 may be further configured to modify the programming schedule to include the media item 304B in the programming schedule of the media feed 302. Alternatively stated, for modification of the programming schedule, the scheduler 118 may extend the programming schedule by repeating the process of the CPO-detection, CPO-bidding, and media item insertion in the media feed 302. The stream manipulator 124 may be configured to dynamically insert the media item 304B at the specified position associated with the detected first CPO 306 in the media feed 302 of the existing channel based on the extended (or modified) programming schedule. Alternatively stated, the stream manipulator 124 may dynamically insert the media item 304B at the specified position associated with the detected first CPO 306 based on the feedback 310 related to the bidding procedure for the detected first CPO 306 received from the exchange system 110. The media item 304A may be replaced by the media item 304B due to the dynamic insertion. The dynamic insertion of the media item 304B may be further based on a presence of an inbound trigger, such as the SCTE-104-based trigger, at the specified position associated with the detected first CPO 306. The inbound trigger may correspond to the metadata associated with CPO 306. The stream manipulator 124 may deliver the media feed 302 including the media item 304B to CDN 126. The CDN 126 may further distribute the media feed 302 including the media item 304B to be viewed on the one or more of the plurality of consumer devices 116a, 116b, and 116c.

In accordance with an embodiment, the scheduler 118 may store a plurality of segments of the media feed 302 including the media item 304B in the media server 122. The stream manipulator 124 may further insert the segments of the media feed 302 including the media item 304B based on the extended (or modified) programming schedule and deliver the media feed 302 including the media item 304B to the CDN 126 for distribution. In accordance with an embodiment, if the exchange system 110 fails to select any winning bid based on the defined set of rules, the stream manipulator 124 may be configured to dynamically insert a default media item in the media feed 302 at the specified position associated with the detected first CPO 306.

Figure 4A:
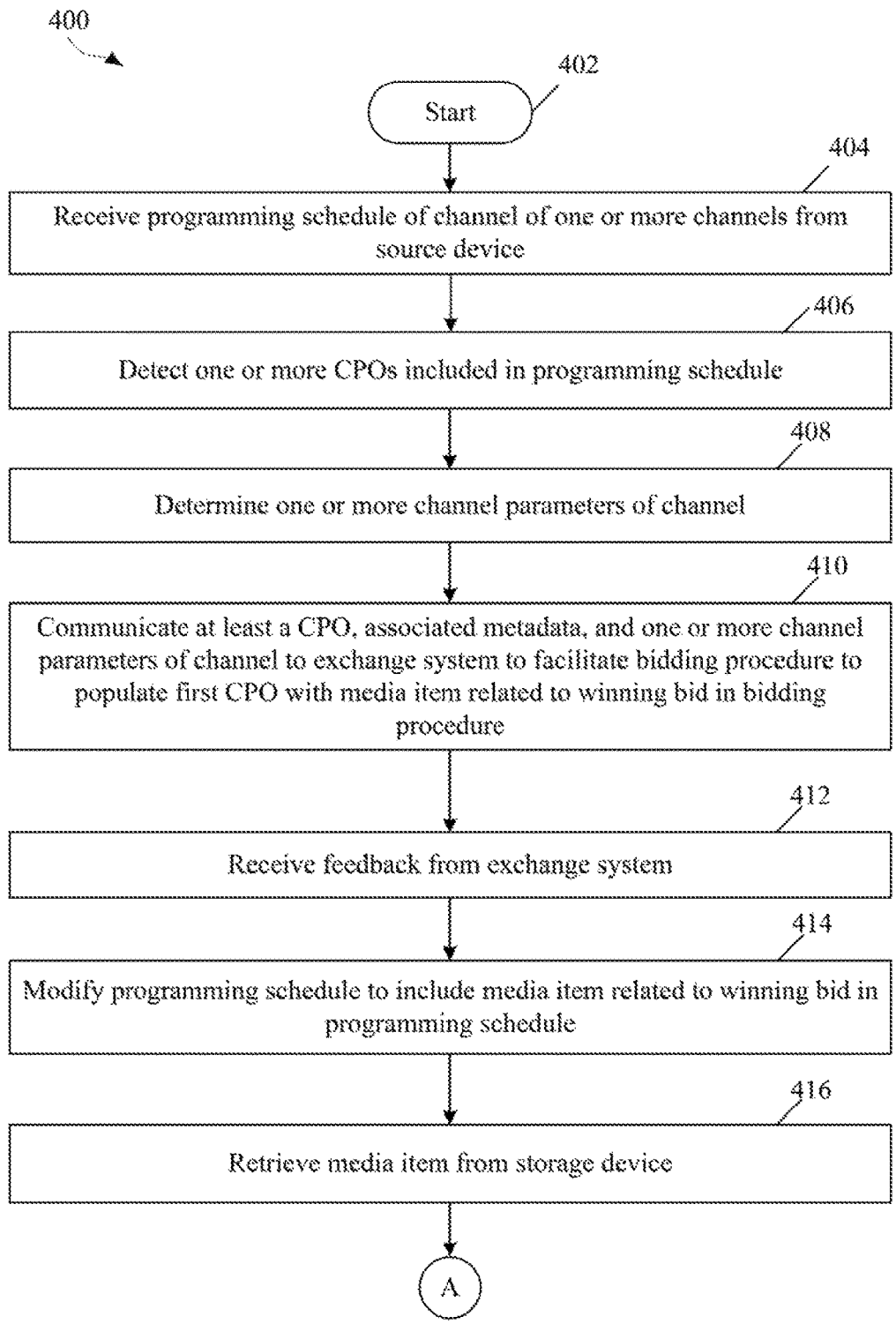
FIGS. 4A and 4B, collectively, depict a flow chart illustrating first exemplary operations for channel scheduling with content placement opportunities by a media packaging and distribution system and a bidding-based exchange system, in accordance with an exemplary embodiment of the disclosure.
Figure 4B:
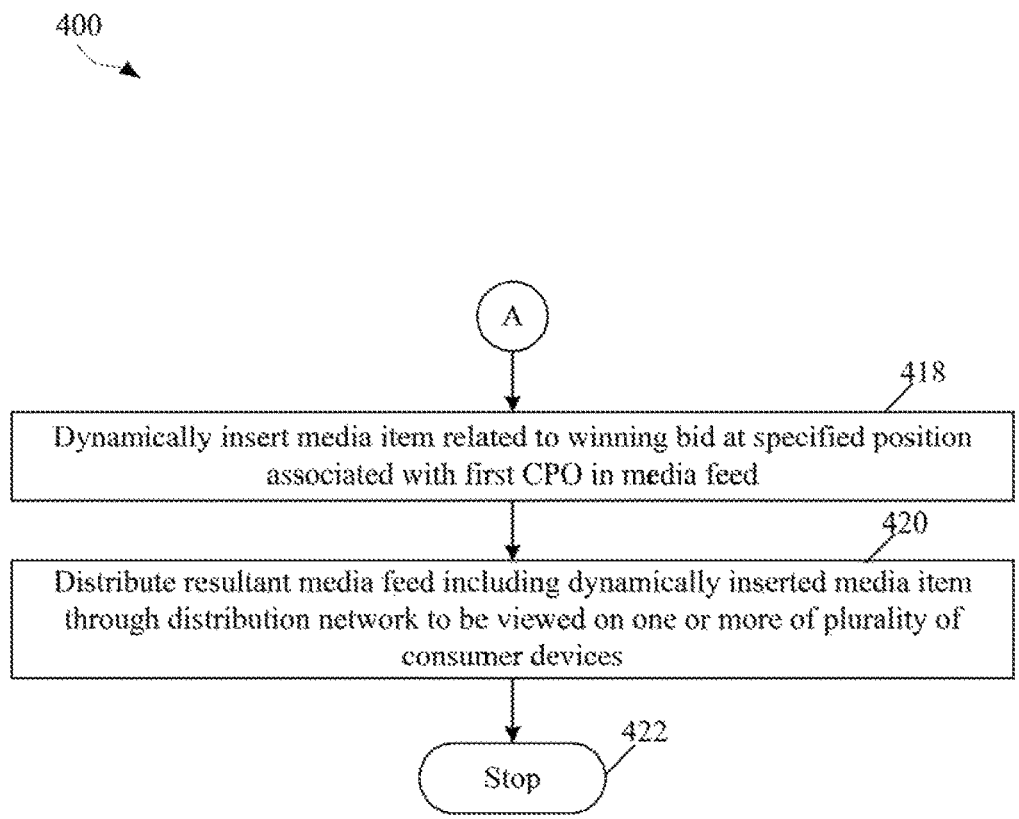

FIGS. 4A and 4B, collectively, depict a flow chart illustrating first exemplary operations for channel scheduling with content placement opportunities by a media packaging and distribution system and a bidding-based exchange system, in accordance with an exemplary embodiment of the disclosure. Referring to FIGS. 4A and 4B, there is shown a flow chart 400 comprising exemplary operations 402 through 422. The exemplary operations may start at 402 and proceed to 404.

At 404, the scheduler 118 may be configured to receive the programming schedule of the channel of the one or more channels from the source device 121. The scheduler 118 may be further configured to receive the media feed 302 related to the programming schedule or an identifier of the media feed. The media feed 302 may correspond to a broadcast feed of an existing channel that has been previously distributed. The programming schedule of the channel may include an ordering, airtime schedule, and references of various program items and non-program items in the media feed 302 of the channel. The programming schedule of the channel may further include the one or more CPOs.

At 406, the CPO system 120 may be configured to detect the one or more CPOs included in the programming schedule. The CPO system 120 may use the programming schedule to identify a content slot that is available for insertion of new content. For example, previously, the media item 304A may be included at a content slot in the programming schedule of the received media feed 302. The CPO system 120 may identify that the order of the media owner related to the media item 304A is cleared and the content slot related to the media item 304A may be vacant for the next playout of the channel. In this scenario, the CPO system 120 may detect the first CPO 306 based on the vacant content slot as, such that the vacant content slot is available for the new content to be inserted.

At 408, the CPO system 120 may be configured to determine the one or more channel parameters of the channel. The one or more channel parameters may include the demographic parameter, a day-part or time-of-day parameter, the viewership parameter, a maturity content-rating parameter, and/or any other parameters describing the one or more CPOs, for use in the exchange system 110. The demographic parameter may refer to a primary demographic (for instance the end users 106 between an age group of 25 to 54) affected by the channel. The daypart parameter may refer to an airtime slot (for instance 8:00 AM to 9:00) related to a CPO (such as the detected first CPO 306) in the channel. The viewership parameter may refer to a count of concurrent end users viewing the channel. The maturity content-rating parameter may refer to a rating based on the type content to be included at a CPO (such as the detected first CPO 306). For example, the content to be included at the CPO 306 may be for kids. Thus, the maturity content-rating parameter may be "kids" for the CPO 306.

At 410, the CPO system 120 may be configured to communicate at least a CPO (such as the detected first CPO 306), associated metadata, and the one or more channel parameters of the channel to the exchange system 110 to facilitate the bidding procedure to populate the first CPO 306 with a media item related to a winning bid in the bidding procedure. The exchange system 110 may be configured to electronically publish information pertaining to the detected first CPO 306, associated metadata, and the determined one or more channel parameters on the plurality of media owner systems 112*a*, . . . , 112*n* for facilitating the bidding procedure for the detected first CPO 306. The plurality of media owners that are interested in availing the detected first CPO 306 for presenting their chosen media items to the end users 106 may place bids (such as the bid 308A and the bid 308B) for the detected first CPO 306 by using the corresponding plurality of media owner systems 112*a*, . . . , 112*n*. The media items may include non-commercial advertising media items and commercial advertising media items. The exchange system 110 may select one winning bid (such as the bid 308A or the bid 308B) for the detected first CPO 306 from the bids received from the plurality of media owner systems 112*a*, . . . , 112*n*. The selection of the one winning bid may be based on the defined set of rules received from the CPO system 120. The defined set of rules may include criteria for the selection of the one winning bid. For example, according a rule in the defined set of rules a highest bid may correspond to a winning bid.

At 412, the CPO system 120 may be configured to receive the feedback 310 from the exchange system 110. The feedback 310 may include information (such as a URL of the media item 304B) pertaining to the selected one winning bid. The media item 304B may be chosen by the media owner of the selected winning bid in the bidding procedure. The feedback 310 may be a real time or near-real time feedback of the winning bid related to the bidding procedure for the detected first CPO 306. At 414, the scheduler 118 may be configured to modify the programming schedule to include the media item (such as the media item 304B) related to the winning bid in the programming schedule. Thus, for modification of the programming schedule, the scheduler 118 may extend the programming schedule based on the CPO-detection, CPO-bidding, and the media item insertion. For example, the programming schedule may include information pertaining to the playout of the media item 304A in the media feed 302. The scheduler 118 may replace the information (such as a reference mapping of the media item 304A) pertaining to the playout of the media item 304A with the information (such as a reference mapping of the media item 304B) pertaining to the playout of the media item 304B in the programming schedule to modify the programming schedule. At 416, the scheduler 118 may be configured to retrieve the media item (such as the media item 304B) from a storage device (such a cloud storage or a media owner system of the first media owner). An encoded version (such as a plurality of segments) of the media feed 302 including the retrieved media item (such as the media item 304B) may be stored in the media server 122.

At 418, the stream manipulator 124 may be configured to dynamically insert the media item (such as the media item 304B) related to the winning bid at a specified position associated with the first CPO 306 in the media feed 302. The dynamic insertion of the media item (such as the media item 304B) may be based on a presence of an inbound trigger at the specified position associated with the detected first CPO 306. The stream manipulator 124 may retrieve the plurality of segments of the pre-encoded media feed 302 and the pre-encoded media item (such as the pre-encoded media item 304B) from the media server 122. The stream manipulator 124 may further use the second programming schedule to stitch the pre-encoded media item (such as the pre-encoded media item 304B) at the specified position associated with the first CPO 306 in the pre-encoded media feed 302.

At 420, the resultant media feed including the dynamically inserted media item may be distributed through the distribution network (such as the network 114 or the CDN 126) to be viewed on one or more of the plurality of consumer devices 116*a*, . . . , 116*n*. The stream manipulator 124 may be configured to transmit the resultant media feed 302 including the dynamically inserted media item (such as the media item 304B) to the CDN 126. The CDN 126 may further distribute the resultant media feed 302 including the dynamically inserted media item to be viewed on the one or more of the plurality of consumer devices 116*a*, . . . , 116*n*. Control passes to end step 422.

Figure 5A:
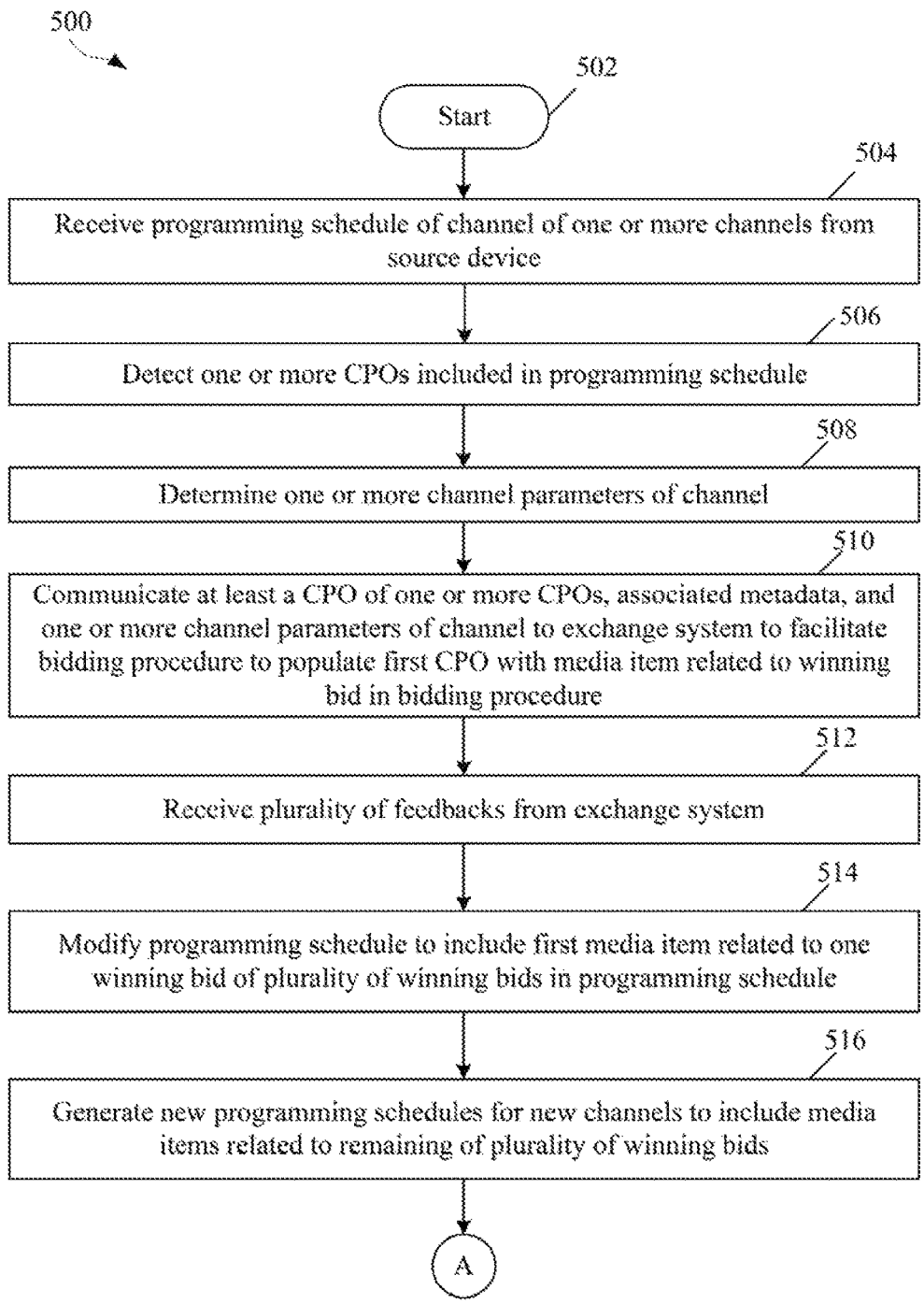
FIGS. 5A and 5B, collectively, depict a flow chart illustrating second exemplary operations for channel scheduling with content placement opportunities by a media packaging and distribution system and a bidding-based exchange system, in accordance with an exemplary embodiment of the disclosure.
Figure 5B:
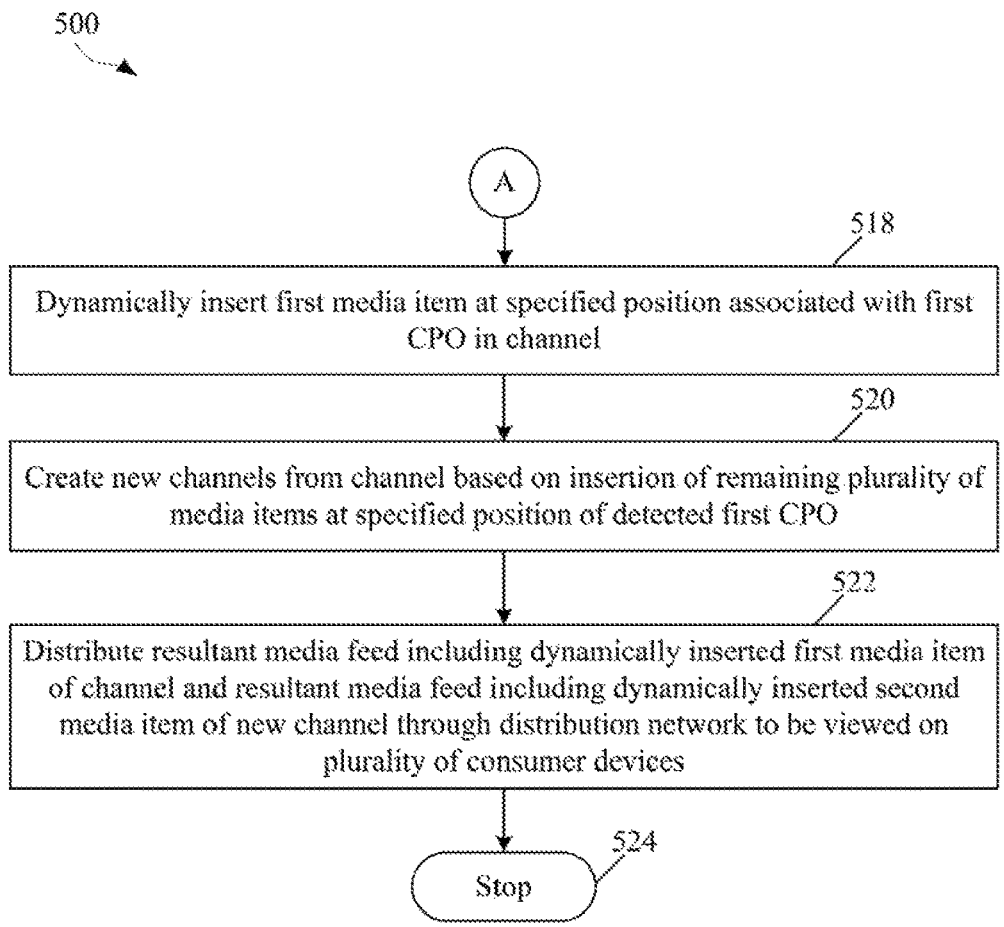

FIGS. 5A and 5B, collectively, depict a flow chart illustrating second exemplary operations for channel scheduling with content placement opportunities by a media packaging and distribution system and a bidding-based exchange system, in accordance with an exemplary embodiment of the disclosure. Referring to FIGS. 5A and 5B, there is shown a flow chart 500 comprising exemplary operations 502 through 524. The exemplary operations may start at 502 and proceed to 504.

At 504, the scheduler 118 may be configured to receive the programming schedule of the channel of the one or more channels from the source device 121. The source device 121 may correspond to the CDN 126 or the plurality of consumer devices 116*a*, . . . , 116*n*. The scheduler 118 may be further configured to receive the media feed 302 related to the programming schedule. In accordance with an embodiment, the scheduler 118 may receive a reference to the location of the media feed 302 from the source device 121. The programming schedule of the channel may further include the one or more CPOs. At 506, the CPO system 120 may be configured to detect the one or more CPOs (such as the first CPO 306) included in the programming schedule.

At 508, the CPO system 120 may be configured to determine the one or more channel parameters of the channel. The one or more channel parameters may include the demographic parameter, a day-part or time-of-day parameter, the viewership parameter, a maturity content-rating parameter, and/or any other parameters describing the one or more CPOs, for use in the exchange system 110. At 510, the CPO system 120 may be configured to communicate at least a CPO (such as the detected first CPO 306) of the one or more CPOs, associated metadata, and the one or more channel parameters of the channel to the exchange system 110 to facilitate the bidding procedure to populate the first CPO 306 with a media item related to a winning bid in the bidding procedure. The exchange system 110 may be configured to electronically publish information pertaining to the detected first CPO 306, associated metadata, and the determined one or more channel parameters on the plurality of media owner systems 112*a*, . . . , 112*n* for facilitating the bidding procedure for the detected first CPO 306. The plurality of media owners may place bids (such as the bid 308A and the bid 308B) for the detected first CPO 306 by using the corresponding plurality of media owner systems 112*a*, . . . , 112*n*. The exchange system 110 may select a plurality of winning bids (for example two bids) for the detected first CPO 306 from the bids received from the plurality of media owner systems 112*a*, . . . , 112*n*. The selection of the plurality of winning bids may be based on the defined set of rules received from the CPO system 120. The defined set of rules may include criteria for the selection of the plurality of winning bids. For example, according a rule in the defined set of rules two highest bids may correspond to the plurality of winning bids.

At 512, the CPO system 120 may be configured to receive a plurality of feedbacks from the exchange system 110. Each feedback in the plurality of feedbacks may include information (such as a URL of a chosen media item) pertaining to a winning bid of the selected plurality of winning bids. For example, the CPO system 120 may receive two feedbacks each corresponding to one of the two winning bids. The plurality of feedbacks may be received in real time or near-real time from the exchange system 110. A media item included in a feedback may be chosen by a media owner (a selected bidder associated with the winning bid) in the bidding procedure. The CPO system 120 may retrieve a plurality of media items (such as a first media item and a second media item) from a storage device (such as cloud storage) based on the plurality of feedbacks. The scheduler 118 may be configured to store an encoded version of the plurality of media items as media assets in the media server 122.

At 514, the scheduler 118 may be configured to modify the programming schedule to include a first media item (such as the media item 304B) related to one winning bid of the plurality of winning bids in the programming schedule. At 516, the scheduler 118 may be configured to generate new programming schedules for new channels to include media items related to the remaining of plurality of winning bids. For example, the plurality of winning bids may include two winning bids (i.e., a first winning bid and second winning bid). The first winning bid may be related to the first media item and the second winning bid may be related to the second media item. The scheduler 118 may modify the programming schedule to include the first media item corresponding to the first winning bid. For the second winning bids, the scheduler 118 may generate a new programming schedule for a new channel to include the second media item.

At 518, the stream manipulator 124 may be configured to dynamically insert the first media item at a specified position associated with the first CPO 306 in the channel. The stream manipulator 124 may further use the modified programming schedule to insert the first media item at the specified position associated with the first CPO 306. The dynamic insertion of the first media item may be based on a presence of an inbound trigger at the specified position associated with the detected first CPO 306.

At 520, the stream manipulator 124 may be configured to create the new channels from the channel based on the insertion of the remaining plurality of media items at the specified position of the detected first CPO 306. For example, the remaining plurality of media items may include the second media item. Thus, the second media item may be dynamically inserted in the media feed 302 to create the new channel based on the new programming schedule. Alternatively stated, the dynamic insertion of the second media item in the media feed 302 to create the new channel may be based on the feedback in the plurality of feedbacks corresponding to the second media item.

At 522, the resultant media feed 302 including the dynamically inserted first media item of the channel and the resultant media feed 302 including the dynamically inserted second media item of the new channel may be distributed through the distribution network (such as the network 114) to be viewed on the plurality of consumer devices 116a, . . . , 116n. The stream manipulator 124 may be configured to transmit the resultant media feed 302 including the dynamically inserted first media item and the resultant media feed 302 including the dynamically inserted second media item to the CDN 126. Alternatively stated, the stream manipulator 124 may concurrently transmit the resultant media feed 302 of the channel and the resultant media feed 302 of the new channel to the CDN 126. The CDN 126 may further distribute the media feed 302 of the channel and the media feed 302 of the new channel to the plurality of consumer devices 116a, . . . , 116n, through the distribution network (such as the network 114). Thus, the plurality of consumer devices 116a, . . . , 116n may be configured to receive both the first channel and the new channel. Control passes to end step 524.

Figure 6:
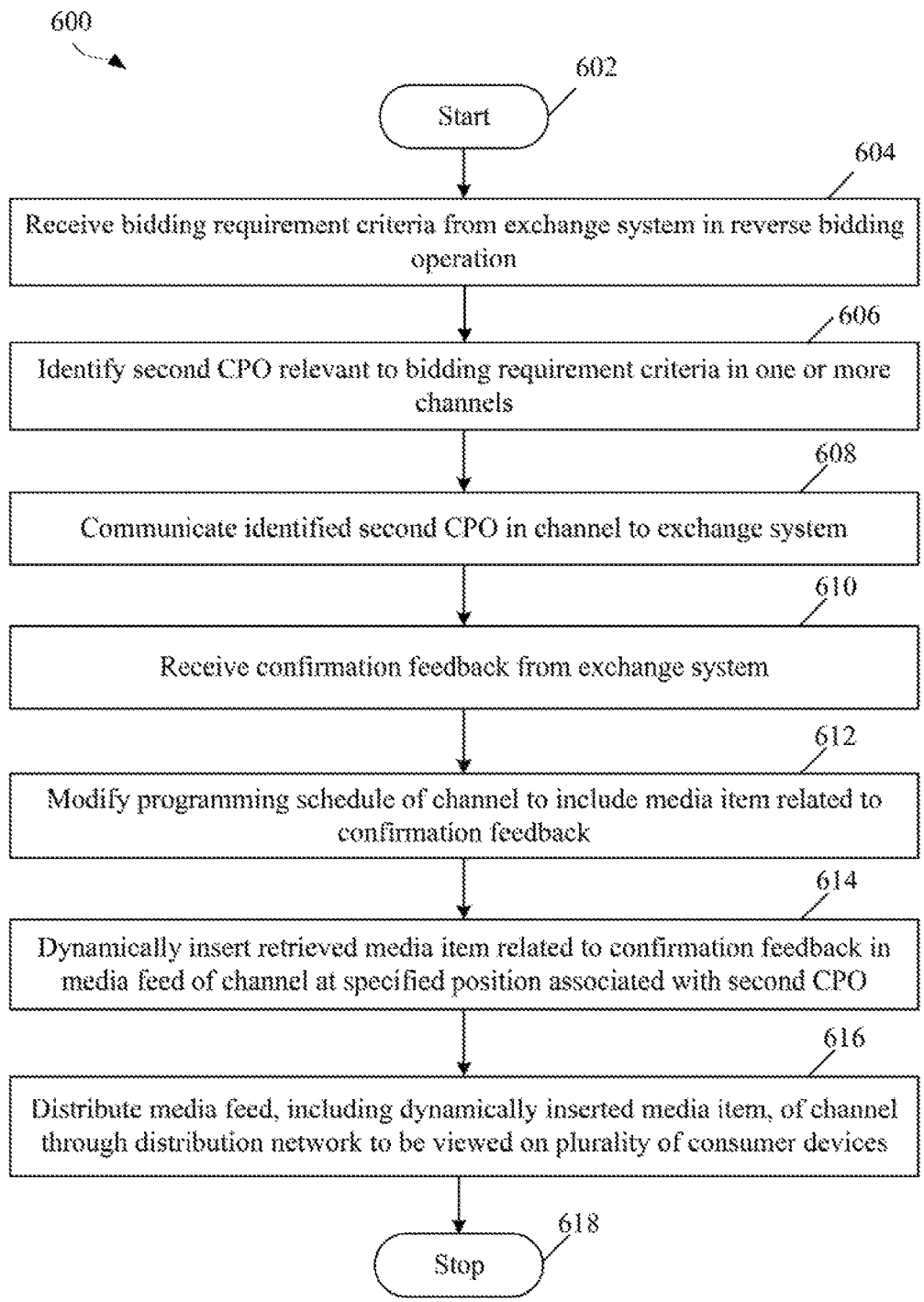
FIG. 6 depicts a flow chart illustrating exemplary operations for channel scheduling with content placement opportunities by a media packaging and distribution system in a reverse bidding procedure, in accordance with an exemplary embodiment of the disclosure.

FIG. 6 depicts a flow chart illustrating exemplary operations for channel scheduling with content placement opportunities by a media packaging and distribution system in a reverse bidding procedure, in accordance with an exemplary embodiment of the disclosure. Referring to FIG. 6, there is shown a flow chart 600 comprising exemplary operations 602 through 620. The exemplary operations may start at 602 and proceed to 604.

At 604, bidding requirement criteria may be received from the exchange system 110 in a reverse bidding operation. The CPO system 120 may be configured to receive the bidding requirement criteria from the exchange system 110 in the reverse bidding operation. The bidding requirement criteria may be provided to the exchange system 110 by a media owner of a media item by use of the corresponding media owner system in the plurality of media owner systems 112a, . . . , 112n. The media owner may have provided the bidding requirement criteria for receiving information pertaining to any available CPO (also referred to as a second CPO) in the one or more channels that is relevant to the bidding requirement criteria. The bidding requirement criteria may include a demographics criterion, a daypart criterion, a selling title criterion, a viewership criterion, or any other criterion necessary to sufficiently describe the CPO, bidding procedure, and/or content offered for bid in the bidding procedure. For example, the media owner may want the second CPO to be identified in a channel that targets a primary demographic (for instance the end users 106 between an age group of 25 to 54) or in a channel that has a certain viewership numbers. In another example, the media owner may want the second CPO to be identified in a specific block or time that matches the daypart criterion or the selling title criterion.

At 606, the second CPO relevant to the bidding requirement criteria may be identified in the one or more channels. The CPO system 120 may be configured to identify the second CPO relevant to the bidding requirement criteria in the one or more channels. The CPO system 120 may identify the second CPO based on the programming schedules of the one or more channels and the received bidding requirement criteria. For example, the CPO system 120 may identify the second CPO in a channel in the one or more channels.

At 608, the identified second CPO in the channel may be communicated to the exchange system 110. The CPO system 120 may be configured to communicate the identified second CPO to the exchange system 110. At 610, a confirmation feedback may be received from the exchange system 110. The CPO system 120 may be configured to receive the confirmation feedback from the exchange system 110. The confirmation feedback may be provided by the media owner who provided the bidding requirement criteria to the exchange system 110. The confirmation feedback may include information (such as a URL) pertaining to a media item chosen by the media owner who provided the bidding requirement criteria.

At 612, the programming schedule of the channel may be modified to include the media item related to the confirmation feedback. The scheduler 118 may be configured to modify the programming schedule of the channel to include the media item related to the confirmation feedback. The scheduler 118 may be further configured to retrieve the media item related to the confirmation feedback from a storage device (such a cloud storage or a media owner system of the first media owner who provided the bidding requirement criteria). The retrieved the media item related to the confirmation feedback may be stored as a VOD asset in the media server 122.

At 614, the retrieved media item related to the confirmation feedback may be dynamically inserted in a media feed of the channel at a specified position associated with the second CPO. The stream manipulator 124 may be configured to dynamically insert the retrieved media item related to the confirmation feedback at the specified position associated with the second CPO. The stream manipulator 124 may use the modified programming schedule of the channel to insert the retrieved media item at the specified position associated with the second CPO. The dynamic insertion of the retrieved media item may be based on a presence of an inbound trigger at the specified position associated with the detected second CPO.

At 616, the media feed, including the dynamically inserted media item, of the channel may be distributed through the distribution network (such as the network 114) to be viewed on the plurality of consumer devices 116a, . . . , 116n. The stream manipulator 124 may be configured to transmit the media feed of the channel that includes the dynamically inserted media item to the CDN 126. The CDN 126 may further deliver the resultant media feed of the channel that includes the dynamically inserted media item to be viewed on the one or more of the plurality of consumer devices 116a, . . . , 116n. Control passes to end 618.

Figure 7:
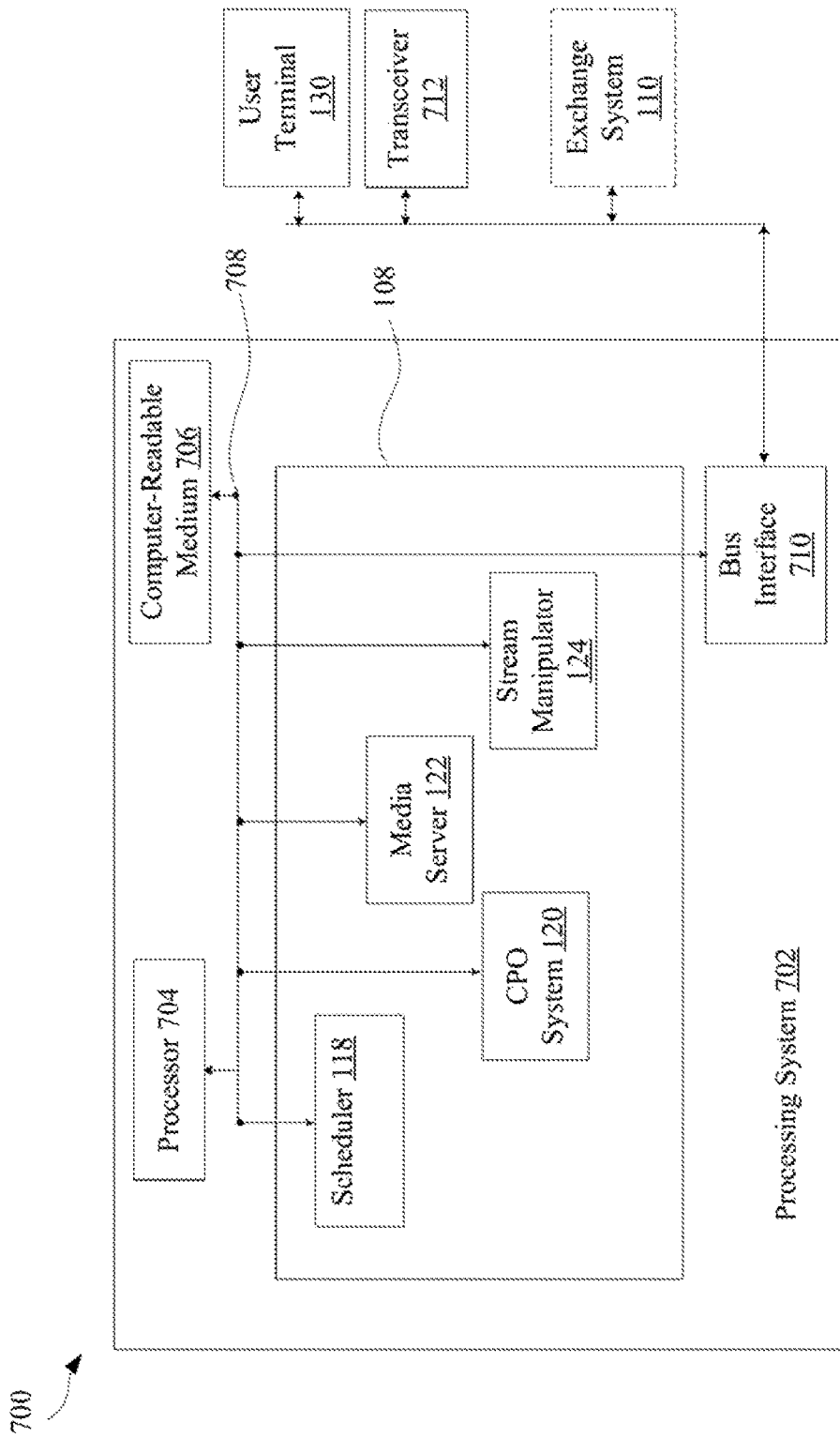
FIG. 7 is a conceptual diagram illustrating an example of a hardware implementation for a television content packaging and distribution system employing a processing system for channel scheduling with content placement opportunities and a bidding-based exchange system, in accordance with an exemplary embodiment of the disclosure.

FIG. 7 is a conceptual diagram illustrating an example of a hardware implementation for a media packaging and distribution system employing a processing system for channel scheduling with content placement opportunities and a bidding-based exchange system, in accordance with an exemplary embodiment of the disclosure. Referring to FIG. 7, the hardware implementation shown by a representation 700 for the media packaging and distribution system 108 employs a processing system 702 for scheduling one or more channels for one or more CPOs, in accordance with an exemplary embodiment of the disclosure, as described herein. In some examples, the processing system 702 may comprise one or more hardware processors 704, a non-transitory computer-readable medium 706, a hardware scheduler 118, a hardware CPO system 120, a hardware media server 122, and a hardware stream manipulator 124. The processing system 702 may be communicatively coupled to the hardware exchange system 110.

In this example, the media packaging and distribution system 108 employing the processing system 702 may be implemented with a bus architecture, represented generally by bus 708. The bus 708 may include any number of interconnecting buses and bridges depending on the specific implementation of the media packaging and distribution system 108 and the overall design constraints. The bus 708 links together various circuits including the one or more processors, represented generally by the processor 704, the non-transitory computer-readable media, represented generally by the computer-readable medium 706, the hardware scheduler 118, the hardware CPO system 120, the hardware media server 122, and the hardware stream manipulator 124, which may be configured to carry out one or more operations or methods described herein. A bus interface 710 provides an interface between the bus 708 and a transceiver 712. The transceiver 712 provides a means for communicating via the network 114 with various other apparatus, such as the plurality of media owner systems 112a, . . . , 112n, the exchange system 110, and the plurality of consumer devices 116a, . . . , 116n.

A user terminal 714 may comprise a keypad, display, speaker, microphone, pointing to enable a user, such as a monitoring user, to interact with the CPO system 120. The user terminal 714 may be configured to present a user interface that enables the monitoring user to configure and interact with components such as the scheduler 118 and the CPO system 120.

The processor 704 may be configured to manage the bus 708 and general processing, including the execution of a set of instructions stored on the computer-readable medium 706. The set of instructions, when executed by the processor 704, causes the media packaging and distribution system 108 to execute the various functions described herein for any particular apparatus. The computer-readable medium 706 may also be used for storing data that is manipulated by the processor 704 when executing the set of instructions. The computer-readable medium 706 may also be configured to store data for one or more of the hardware scheduler 118, the hardware CPO system 120, the hardware media server 122, and/or the hardware stream manipulator 124.

In an aspect of the disclosure, the processor 704, the computer-readable medium 706, or a combination of both may be configured or otherwise specially programmed to execute the operations or functionality of the hardware scheduler 118, the hardware CPO system 120, the hardware media server 122, the hardware stream manipulator 124, or various other components described herein. For example, the processor 704, the computer-readable medium 706, or a combination of both may be configured or otherwise specially programmed to perform the operations and functionality of the hardware scheduler 118, the hardware CPO system 120, the hardware media server 122, and/or the hardware stream manipulator 124 as described with respect to FIGS. 1A, 1B, 2, 3, 4A, 4B, 5A, 5B, and 6.

Various embodiments of the disclosure comprise a media packaging and distribution system 108 that may be configured to handle distribution of one or more channels to be viewed on a plurality of consumer devices, such as the plurality of consumer devices 116a, . . . , 116n. The media packaging and distribution system 108 may comprise, for example, the scheduler 118, the CPO system 120, the media server 122, and the stream manipulator 124. The scheduler 118 may be configured to receive programming schedule of a channel of the one or more channels which includes one or more CPOs (such as the first CPO 306). The scheduler 118 may be further configured to receive the media feed (such as the media feed 302) related to the programming schedule. The CPO system 120 may be configured to communicate at least a CPO (such as the first CPO 306) from the one or more CPOs, associated metadata, and one or more channel parameters of the channel to an exchange system (such as the exchange system 110) to facilitate a bidding procedure to populate the CPO 306 with a media item (such as the media item 304B) related to a winning bid in the bidding procedure. The one or more channel parameters may include a demographic parameter, a day-part or time-of-day parameter, a viewership parameter, a maturity content-rating parameter, and/or any other parameters describing the CPO, for use in the exchange system. The scheduler 118 may be configured to dynamically insert the media item 304B related to the winning bid at a specified position in the media feed 302 associated with the CPO 306. The stream manipulator 124 may be configured to distribute the resultant media feed 302 that includes the media item 304B over a distribution network (such as the network 114) to be viewed on the one or more consumer devices. The media item 304B inserted in the resultant media feed 302 may be selected by a bidder associated with the winning bid, based on an outcome of the bidding procedure in the exchange system 110. The media item (such as the media item 304B) is inserted at the specified position in the media feed 302 associated with the CPO 306 based on a real time or near-real time feedback (such as the feedback 310) of the winning bid received from the exchange system 110.

The scheduler 118 may receive a reference (such as the URL) to a location of the media item (such as the media item 304B) related to the winning bid from the exchange system 110. The reference of the location is included in a feedback (such as the feedback 310) received from the exchange system 110. The media item (such as the media item 304B) may be retrieved from a data storage device, based on the received reference of the location of the media item 304B. The stream manipulator 124 may be configured to insert the media item (such as media item 304B) based on a presence of an inbound trigger at the specified position associated with the detected first CPO 306.

The scheduler 118 may be further configured to extend the programming schedule by repeating the process of CPO-detection, CPO-bidding, and media item insertion in the media feed 302. The first media item may correspond to a non-commercial advertising media item or a commercial advertising media item. The scheduler 118 may be configured to store a plurality of segments of the media feed 302 comprising the dynamically inserted media item (such as the media item 304B) as a plurality of pre-encoded media assets.

The scheduler 118 may be configured to create a new channel from the channel based on the insertion of another media item at the specified position of the CPO 306. The stream manipulator 124 may be configured to dynamically insert the other media item in the media feed 302 at the specified position of the CPO 306 to create the new channel, based on another feedback related to another winning bid for the CPO 306 received from the exchange system 110. The scheduler 118 may be configured to generate a new programming schedule for the new channel to include the other media item such that the other media item may be inserted at the specified position associated with the CPO 306 in the media feed 302 for the new channel. The new channel may be delivered through the distribution network (such as the network 114) to be viewed on the one or more of the plurality of consumer devices 116*a*, . . . , 116*n*. The CPO system 120 may receive bidding requirement criteria from the exchange system 110 in a reverse bidding operation to identify another CPO in the one or more channels relevant to the bidding requirement criteria. The bidding requirement criteria may include a demographics criterion, a daypart criterion, a selling title criterion, a viewership criterion, or any other criterion necessary to sufficiently describe the CPO 306, bidding procedure, and/or content offered for bid in the bidding procedure.

Various embodiments of the disclosure may provide a non-transitory computer-readable medium having stored thereon, computer readable instruction that when executed by a processor, causes a media packaging and distribution system to execute operations to handle distribution of one or more channels to be viewed on a plurality of consumer devices. The media packaging and distribution system 108 may execute operations comprising receiving a programming schedule of a channel of one or more channels. At least a CPO (such as the first CPO 306) from the one or more CPOs, associated metadata, and one or more channel parameters of the channel may be communicated to an exchange system (such as the exchange system 110) to facilitate a bidding procedure to populate the CPO with a media item (such as the media item 304B) related to a winning bid in the bidding procedure. The media item (such as the media item 304B) related to the winning bid may be dynamically inserted at a specified position in a media feed (such as the media feed 302) associated with the CPO 306. A resultant media feed 302 that includes the media item 304B may be distributed over a distribution network to be viewed on the one or more consumer devices. The media item 304B may be inserted in the resultant media feed 302 based on an outcome of the bidding procedure in the exchange system 110.

The CPO system 120 provides significant productivity and efficiency improvements in the scheduling of various broadcast channels. The CPO system 120 may automatically detect the presence of any available CPO in programming schedules of one or more channels. In contrast to repeated manual inspection of the programming schedules of the one or more channels, where the chances of missing out on the available CPOs are very high due to human error, the CPO system 120 misses no available CPOs. Thus, improving the revenue and managing resources of the media distribution provider 102 by automating the CPO detection. An exemplary media distribution provider 102 may be a broadcast network provider.

The CPO system 120 may further enable the exchange system 110 to carry out the bidding procedure smoothly. The real-time detection of the CPO by the CPO system 120 may further enable the exchange system 110 to conduct real-time bidding for the available CPO. This further enables the stream manipulator 124 to dynamically insert the media items related to winning bids at the detected CPO. The scheduler 118, the CPO system 120, and the stream manipulator 124, further overcomes the requirement of re-encoding of the media items at times of creation of new channels or replacing media content of an existing channel with new media content. Currently, dedicated encoders, such as physical encoders, are used to encode each program stream before transmission (i.e. before a distribution of a program stream of a channel). Such dedicated encoders are not only costly but also limit ability of a broadcast provider to swap or change content dynamically in a program stream as each content item needs to pass through such dedicated encoders for transmission. In other words, if any new content item is to be inserted in the program stream of channel that is to be distributed, that program stream then needs to be re-encoded again. This in turn increases re-work and requires installation of large infrastructures and resources to maintain uninterrupted content delivery for existing channel and limits the ability of the broadcast or network provider to change content in real time or near-real time. In accordance with the various embodiments of the present disclosure, the media packaging and distribution system 108 provides an ability to dynamically schedule a media item, such as a pre-encoded VOD asset, and insert the media item in an existing live media feed of a channel to be directly delivered through the distribution network (such as the network 114) to be viewed on one or more consumer devices 116*a*, . . . , 116*n*. The program stream in which the new media item is inserted may not be required to pass through the dedicated encoders before delivery through the distribution network (such as the network 114 or the CDN 126). Thus, reducing the hardware requirement of the broadcasting network provider's systems. This enables a faster and timely playout of the media feed of existing as well as new channels. The CPO system 120 may further identify CPOs in one or more channels to cater the bidding requirement criteria of various media owners during a reverse bidding operation. Thus, the CPO system 120 and the scheduler 118 enable the media packaging and distribution system 108, and the exchange system 110 to operate more efficiently and optimally providing both an economic and a cost advantage.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for channel scheduling with content placement opportunities and a bidding-based exchange system.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual sever or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
one or more processors in a media packaging and distribution system that controls distribution of one or more channels to be viewed on one or more of a plurality of consumer devices, the one or more processors are configured to:
receive a first programming schedule of a first channel of the one or more channels which includes one or more content placement opportunities (CPOs);
communicate at least a first CPO from the one or more CPOs, metadata associated with the first CPO, and one or more channel parameters of the first channel to an exchange system to facilitate a bidding procedure, wherein the bidding procedure is facilitated to populate the first CPO with a first media item related to a first winning bid in the bidding procedure;
dynamically insert the first media item related to the first winning bid at a specified position in a media feed associated with the first CPO based on a substantially real-time feedback of the first winning bid received from the exchange system;
distribute a resultant media feed that includes the first media item, over a distribution network to be viewed on one or more consumer devices, wherein the first media item inserted in the resultant media feed is selected by a bidder associated with the first winning bid based on an outcome of the bidding procedure in the exchange system; and
extend the first programming schedule by repeating a process of CPO-detection, CPO-bidding, and media item insertion in the media feed generated by the media packaging and distribution system.

2. The system according to claim 1, wherein the one or more processors are further configured to receive the media feed related to the first programming schedule of the first channel.

3. The system according to claim 1, wherein the first media item is dynamically inserted at the specified position in the media feed associated with the first CPO further based on a near-real time feedback of the first winning bid received from the exchange system.

4. The system according to claim 1, wherein the first media item corresponds to a non-commercial advertising media item.

5. The system according to claim 1, wherein the first media item corresponds to a commercial advertising media item.

6. The system according to claim 1, wherein the one or more processors are further configured to store a plurality of segments of the resultant media feed comprising the dynamically inserted first media item as a plurality of pre-encoded media assets.

7. The system according to claim 1, wherein the one or more channel parameters include at least one of a demographic parameter, a day-part parameter, a time-of-day parameter, a viewership parameter, a maturity content-rating parameter, or other parameters describing the first CPO, for use in the exchange system.

8. The system according to claim 1, wherein the one or more processors are further configured to create a second channel from the first channel based on insertion of a second media item at the specified position of the first CPO, wherein the second media item is dynamically inserted in the media feed at the specified position of the first CPO to create the second channel, wherein the dynamic insertion at the specified position is based on another feedback related to a second winning bid for the first CPO received from the exchange system.

9. The system according to claim 8, wherein the one or more processors are further configured to generate a second programming schedule for the second channel to include the second media item such that the second media item is inserted at the specified position associated with the first CPO in the media feed for the second channel, and delivered through the distribution network to be viewed on the one or more consumer devices.

10. The system according to claim 1, wherein the insertion of the first media item is based on a presence of an inbound trigger at the specified position in the media feed associated with the first CPO.

11. The system according to claim 1, wherein the one or more processors are further configured to receive a reference to a location of the first media item related to the first winning bid from the exchange system, wherein the reference is included in the substantially real-time feedback received from the exchange system.

12. The system according to claim 11, wherein the one or more processors are further configured to retrieve the first media item from a data storage device, based on the received reference of the location of the first media item.

13. The system according to claim 1, wherein the one or more processors are further configured to receive bidding requirement criteria from the exchange system in a reverse bidding operation to identify a second CPO in the one or more channels relevant to the bidding requirement criteria.

14. The system according to claim 13, wherein the bidding requirement criteria includes at least one of a demographics criterion, a daypart criterion, a selling title criterion, a viewership criterion, or any other criterion necessary to sufficiently describe the second CPO, bidding procedure, or content offered for bid in the bidding procedure.

15. A method, comprising:
in a media packaging and distribution system that controls distribution of one or more channels to be viewed on one or more of a plurality of consumer devices:
receiving a first programming schedule of a first channel of the one or more channels which includes one or more content placement opportunities (CPOs);
communicating at least a first CPO from the one or more CPOs, metadata associated with the first CPO, and one or more channel parameters of the first channel to an exchange system to facilitate a bidding procedure, wherein the bidding procedure is facilitated to populate the first CPO with a first media item related to a first winning bid in the bidding procedure;
dynamically inserting the first media item related to the first winning bid at a specified position in a media feed associated with the first CPO based on a substantially real-time feedback of the first winning bid received from the exchange system;
distributing a resultant media feed that includes the first media item, over a distribution network to be viewed on one or more consumer devices, wherein the first media item inserted in the resultant media feed is selected by a bidder associated with the first winning bid based on an outcome of the bidding procedure in the exchange system; and
extending the first programming schedule by repeating a process of CPO-detection, CPO-bidding, and media item insertion in the media feed generated by the media packaging and distribution system.

16. The method according to claim 15, further comprising receiving the media feed related to the first programming schedule of the first channel.

17. The method according to claim 15, wherein the first media item is dynamically inserted at the specified position in the media feed associated with the first CPO further based on a near-real time feedback of the first winning bid received from the exchange system.

18. The method according to claim 15, wherein the first media item corresponds to a non-commercial advertising media item.

19. The method according to claim 15, wherein the first media item corresponds to a commercial advertising media item.

20. The method according to claim 15, further comprising storing a plurality of segments of the resultant media feed comprising the dynamically inserted first media item as a plurality of pre-encoded media assets.

21. The method according to claim 15, wherein the one or more channel parameters include information such as at least one of a demographic parameter, a day-part parameter, time-of-day parameter, a viewership parameter, a maturity content-rating parameter, or any other parameter(s) describing the first CPO, for use in the exchange system.

22. The method according to claim 15, further comprising creating a second channel from the first channel based on insertion of a second media item at the specified position of the first CPO, wherein the second media item is dynamically inserted at the specified position of the first CPO to create the second channel, wherein the dynamic insertion at the specified position is based on another feedback related to a second winning bid for the first CPO received from the exchange system.

23. The method according to claim 22, further comprising generating a second programming schedule for the second channel to include the second media item such that the second media item is inserted at the specified position associated with the first CPO in the media feed for the second channel, and delivered through the distribution network to be viewed on the one or more consumer devices.

24. The method according to claim 15, wherein the dynamic insertion of the first media item is based on a presence of an inbound trigger at the specified position related to the first CPO.

25. The method according to claim 15, further comprising receiving a reference to a location of the first media item related to the first winning bid from the exchange system, wherein the reference is included in the substantially real-time feedback received from the exchange system.

26. The method according to claim 25, further comprising retrieving the first media item from a data storage device, based on the received reference of the location of the first media item.

27. The method according to claim 15, further comprising receiving bidding requirement criteria from the exchange system in a reverse bidding operation to identify a second CPO in the one or more channels relevant to the bidding requirement criteria.

28. The method according to claim 27, wherein the bidding requirement criteria includes at least one of a demographics criterion, a daypart criterion, a selling title criterion, a viewership criterion, or other criterion necessary to sufficiently describe the second CPO, bidding procedure, or content offered for bid.

29. A non-transitory computer-readable medium having stored thereon, computer executable instructions, which when executed by a computer, cause the computer to execute operations, the operations comprising:
   in a media packaging and distribution system that is configured to control distribution of one or more channels to be viewed on one or more of a plurality of consumer devices:
   receiving a first programming schedule of a first channel of the one or more channels which includes one or more content placement opportunities (CPOs));
   communicating at least a first CPO from the one or more CPOs, metadata associated with the first CPO, and one or more channel parameters of the first channel to an exchange system to facilitate a bidding procedure, wherein the bidding procedure is facilitated to populate the first CPO with a first media item related to a first winning bid in the bidding procedure;
   dynamically inserting the first media item related to the first winning bid at a specified position in a media feed associated with the first CPO based on a substantially real-time feedback of the first winning bid received from the exchange system;
   distributing a resultant media feed that includes the first media item, over a distribution network to be viewed by one or more consumer devices, wherein the first media item inserted in the resultant media feed is selected by a bidder associated with the first winning bid based on an outcome of the bidding procedure in the exchange system; and
   extending the first programming schedule by repeating a process of CPO-detection, CPO-bidding, and media item insertion in the media feed generated by the media packaging and distribution system.

30. The non-transitory computer-readable medium according to claim 29, wherein the first media item is dynamically inserted at the specified position associated with the first CPO further based on a near-real time feedback of the first winning bid received from the exchange system.

* * * * *